United States Patent
Igarashi et al.

(10) Patent No.: US 11,451,305 B2
(45) Date of Patent: Sep. 20, 2022

(54) OPTICAL RECEIVING APPARATUS, OPTICAL TRANSMITTING APPARATUS, AND FREQUENCY OFFSET ESTIMATION METHOD

(71) Applicant: NIPPON TELEGRAPH AND TELEPHONE CORPORATION, Tokyo (JP)

(72) Inventors: Ryo Igarashi, Tokyo (JP); Masamichi Fujiwara, Tokyo (JP); Takuya Kanai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/271,169

(22) PCT Filed: Aug. 30, 2019

(86) PCT No.: PCT/JP2019/034095
§ 371 (c)(1),
(2) Date: Feb. 24, 2021

(87) PCT Pub. No.: WO2020/050163
PCT Pub. Date: Mar. 12, 2020

(65) Prior Publication Data
US 2021/0399809 A1    Dec. 23, 2021

(30) Foreign Application Priority Data
Sep. 5, 2018 (JP) .............................. JP2018-166306

(51) Int. Cl.
*H04B 10/61* (2013.01)
*H04B 10/077* (2013.01)
(Continued)

(52) U.S. Cl.
CPC ....... *H04B 10/6165* (2013.01); *H04B 10/077* (2013.01); *H04L 27/20* (2013.01); *H04L 27/223* (2013.01)

(58) Field of Classification Search
CPC ... H04B 10/077; H04B 10/6165; H04L 27/20; H04L 27/223
(Continued)

(56) References Cited

U.S. PATENT DOCUMENTS

| 5,537,437 A | * | 7/1996 | Kaku | ...................... H04L 7/041 375/348 |
| 8,644,766 B2 | * | 2/2014 | Fujino | ................. H04L 27/0014 455/67.11 |

(Continued)

FOREIGN PATENT DOCUMENTS

| GB | 2275398 A | 8/1994 |
| JP | S61107850 A | 5/1986 |

(Continued)

OTHER PUBLICATIONS

Koma et al; Wide range Carrier frequency offset Estimation method using training symbols with Asymmetric Constellations for burst-mode coherent reception; 2018;Optical society of America; pp. 1-3. (Year: 2018).*

(Continued)

*Primary Examiner* — Amritbir K Sandhu
(74) *Attorney, Agent, or Firm* — Harness, Dickey & Pierce, P.L.C.

(57) ABSTRACT

Upon receipt of a coherent optical signal that includes a training signal generated using a code sequence constituted by multi-value phase modulation symbols, in which a deviation angle of a vector average of a one-symbol delay differential component of a signal generated on the basis of the code sequence has a prescribed angle and a modulation (Continued)

phase difference between adjacent symbols has a fixed, repeated pattern, a reception training signal corresponding to a training code sequence for frequency offset estimation is detected within a reception signal acquired by converting the received coherent optical signal into an electric signal, a plurality of delay differential components are calculated on the basis of the detected reception training signal and at least two delay signals of the reception training signal, each delay signal having a different number of delay symbols, and an averaged frequency offset amount is calculated using the calculated plurality of delay differential components.

7 Claims, 13 Drawing Sheets

(51) Int. Cl.
    *H04L 27/20*     (2006.01)
    *H04L 27/22*     (2006.01)

(58) Field of Classification Search
    USPC .................................................... 398/208
    See application file for complete search history.

(56) References Cited

U.S. PATENT DOCUMENTS

| | | | | |
|---|---|---|---|---|
| 8,787,769 | B2* | 7/2014 | Ishihara | H04B 3/06 |
| | | | | 398/208 |
| 9,621,299 | B2* | 4/2017 | Ishihara | H04B 10/6161 |
| 10,171,173 | B2* | 1/2019 | Okamoto | H04B 10/508 |
| 2008/0310531 | A1* | 12/2008 | Bai | H04L 27/2613 |
| | | | | 375/260 |
| 2010/0232805 | A1* | 9/2010 | Cai | H04L 27/223 |
| | | | | 398/209 |
| 2011/0194855 | A1* | 8/2011 | Batshon | H04B 10/60 |
| | | | | 398/202 |
| 2012/0070159 | A1* | 3/2012 | Ishihara | H04B 10/50 |
| | | | | 398/208 |
| 2013/0070874 | A1* | 3/2013 | Nakagawa | H04L 27/2659 |
| | | | | 375/334 |
| 2013/0336654 | A1* | 12/2013 | Arikawa | H04J 14/06 |
| | | | | 398/65 |

FOREIGN PATENT DOCUMENTS

| | | |
|---|---|---|
| JP | H04115726 A | 4/1992 |
| JP | H06244879 A | 9/1994 |

OTHER PUBLICATIONS

Andreas Leven et al., Frequency Estimation in Intradyne Reception, IEEE Photonics Technology Letters, vol. 19, No. 6, Mar. 15, 2007.

Lei Li et al., Wide-range, Accurate and Simple Digital Frequency Offset Compensator for Optical Coherent Receivers, OFC/NFOEC 2008.

Xian Zhou et al., Wide-Range Frequency Offset Estimation Algorithm for Optical Coherent Systems Using Training Sequence, IEEE Photonics Technology Letters, vol. 24, No. 1, Jan. 1, 2012.

Ryo Koma et al., Wide Range Carrier Frequency Offset Estimation Method using Training Symbols with Asymmetric Constellations for Burst-Mode Coherent Reception, OFC 2018.

* cited by examiner

OPTICAL RECEIVING APPARATUS, OPTICAL TRANSMITTING APPARATUS, AND FREQUENCY OFFSET ESTIMATION METHOD

CROSS-REFERENCE TO RELATED APPLICATIONS

This application is a 371 U.S. National Phase of International Application No. PCT/JP2019/034095 filed on Aug. 30, 2019, which claims priority to Japanese Application No. 2018-166306 filed on Sep. 5, 2018. The entire disclosures of the above applications are incorporated herein by reference.

TECHNICAL FIELD

The present invention relates to an optical receiving apparatus, an optical transmitting apparatus, and a frequency offset estimation method.

BACKGROUND ART

At present, PON (Passive Optical Network) systems standardized by the IEEE (The Institute of Electrical and Electronics Engineers, Inc) or the ITU-T (International Telecommunication Union Telecommunication Standardization Sector) are widely used in optical subscriber systems.

In an optical transmission system 300 using a PON system, as shown in FIG. 8, communication is performed between an OLT (Optical Line Terminal) 320 serving as a single station-side device, and ONUs (Optical Network Units) 310-1 to 310-3 serving as a plurality of subscriber devices. During downstream communication in the PON system, an optical signal transmitted from the OLT 320 is split onto a plurality of paths by an optical splitter 330 and received by the respective ONUs 310-1 to 310-3. At this time, the ONUs 310-1 to 310-3 select and receive signals only in time slots allocated respectively thereto.

During upstream communication, meanwhile, the ONUs 310-1 to 310-3 transmit signals only in the time slots allocated respectively thereto so as to avoid collisions with the signals transmitted from the other ONUs 310-1 to 310-3. Thus, in the PON system, the same optical fiber can be shared by a plurality of subscribers, thereby suppressing equipment costs, and as a result, a high-speed optical access service can be provided economically.

In an access network using the PON system, it is desirable to extend the maximum transmission distance and increase the number of branches generated by the optical splitter 330 in order to reduce equipment costs. The reason why it is desirable to extend the maximum transmission distance is that in so doing, lines covering a wide area can be integrated into a single station. Further, the reason why it is desirable to increase the number of branches generated by the optical splitter 330 is that by integrating a large number of lines into the single OLT 320, the number of OLTs 320 and stations per line can be reduced, enabling a reduction in equipment installation and operation costs.

However, extending the transmission distance and increasing the number of branches of the optical splitter 330 lead to an increase in optical loss, and as a result, the signal optical intensity at the time of reception decreases, leading to a reduction in the signal to noise ratio and deterioration of the bit error rate. In addition, extending the transmission distance leads to waveform deterioration in the signal due to chromatic dispersion, and this also results in a reduction in the bit error rate due to wavelength deterioration. Therefore, to extend the transmission distance and increasing the number of branches of the optical splitter 330, it is important to employ a technique for reducing the signal to noise ratio and compensating for waveform deterioration in the receiver.

To prevent a reduction in the signal to noise ratio, a method of disposing an optical amplifier at the front stage of an optical receiver and amplifying the signal light may be considered. With this method, however, a problem exists in that the amplification effect is limited to approximately 10 dB due to ASE (Amplified Spontaneous Emission) noise generated during optical amplification.

By employing a method of disposing an optical amplifier midway along the transmission path, meanwhile, the effect of ASE noise can be suppressed to a comparatively low level. With this method, however, it is necessary to newly install relay equipment midway on the transmission path, leading to an increase in cost.

Further, to compensate for waveform deterioration, a method of inserting a compensatory optical fiber midway along the transmission path may be considered. However, the distance between the subscriber device that transmits the signal and the station equipment varies from subscriber to subscriber, leading to variation in the required characteristics of the compensatory fiber, and therefore this method also results in an increase in cost.

To solve these problems, introducing a digital coherent system into an access network has been considered. In a conventional IM-DD (Intensity Modulation-Direct Detection) system, a reduction in the signal to noise ratio is realized by thermal noise in the receiver. In a digital coherent system, on the other hand, thermal noise generated in the receiver is reduced by performing coherent reception, thereby allowing reception at a signal to noise ratio close to the shot-noise limit. Further, with a digital coherent system, it is possible to compensate for waveform deterioration generated during propagation by implementing digital signal processing on the reception signal.

CITATION LIST

Non Patent Literature

[NPL 1] Andreas Levin, Noriaki Kaneda, Ut-Va Koc, and Young-Kai Chen, "Frequency Estimation in Intradyne Reception", IEEE PHOTONICS TECHNOLOGY LETTERS, VOL. 19, NO. 6, MARCH 2015, 2007

[NPL 2] Lei Li, Zhenning Tao, Shoichiro Oda, Takeshi Hoshida, and Jens C. Rasmussen, "Wide-range, Accurate and Simple Digital Frequency Offset Compensator for Optical Coherent Receivers", OFC/NFOEC 2008

[NPL 3] Xian Zhou, Xue Chen, and Keping Long, "Wide-Range Frequency Offset Estimation Algorithm for Optical Coherent Systems Using Training Sequence", IEEE PHOTONICS TECHNOLOGY LETTERS, VOL. 24, NO. 1, Jan. 1, 2012

[NPL 4] Ryo Koma, Masamichi Fujiwara, Ryo Igarashi, Takuya Kanai, Jun-ichi Kani, and Akihiro Otaka, "Wide Range Carrier Frequency Offset Estimation Method using Training Symbols with Asymmetric Constellations for Burst-Mode Coherent Reception", OFC 2018

SUMMARY OF THE INVENTION

Technical Problem

A reception-side device of a digital coherent system performs coherent reception in order to detect a phase component of signal light by measuring the intensity of an interference waveform between a transmitted optical signal and local oscillation light (also referred to hereafter as local light). In the reception signal at the time of coherent reception, a frequency offset component that varies according to the frequency of the difference between the frequency of the signal light and the frequency of the local light is superimposed on a modulation component corresponding to a transmission code sequence. To reproduce the modulation component corresponding to the transmission code sequence on the reception side, it is necessary to remove the frequency offset component from the reception signal. For this purpose, it is necessary to estimate the frequency offset amount on the reception side.

In an access network, an inexpensive light source is used as the light source of the transmission device in order to reduce costs, and therefore frequency variation among transmission devices is likely to be larger than in the case of a core network. Accordingly, the size range of the frequency offset amount generated on the reception side is also likely to be wide. Therefore, the technique used to estimate the frequency offset amount in the access network must be a technique with a wide estimation frequency range.

Further, during upstream communication in a PON system, the signal received by the OLT 320 is a burst signal, and in each time slot, the OLT 320 receives a signal transmitted from a different ONU 310-1 to 310-3. It is therefore necessary to estimate the frequency offset amount on the reception side in each time slot, meaning that estimation is performed more frequently than in a core network.

A method of estimating the frequency offset amount by analyzing a code sequence applied to a fixed interval of the transmission signal on the reception side, for example, may be employed as a technique for estimating the frequency offset amount.

When this method of estimating the frequency offset amount by analyzing a code sequence is applied to an access network in which the frequency offset amount is estimated frequently, it is necessary to reduce the processing time required for estimation to ensure that transmission is performed efficiently. For this purpose, it is important to reduce the number of code sequences used for frequency offset amount estimation, which do not contribute to data transmission.

In consideration of the above, in a technique for estimating the frequency offset amount in an access network, the estimation frequency range must be wide, and the number of code sequences used for estimation must be small.

A technique using an M multiplication method (see NPL 1, for example), a technique using a feedback loop (see NPL 2, for example), and so on, for example, have been proposed as techniques for estimating the frequency offset amount.

The M multiplication method is a method for removing a frequency offset component and extracting a modulation component by calculating a one-symbol delay differential of the reception signal and multiplying the result M times (here, M is a multi-value number, and in the case of BPSK (Binary Phase Shift Keying), M=2). In the M multiplication method, the frequency range in which the frequency offset amount can be estimated is expressed by $-B/2M \le f_{IF} < B/2M$ (here, B is the baud rate of the symbols in the transmission signal, and $f_{IF}$ is the frequency difference between the signal light and the local light). Therefore, in a case where the M multiplication method is used, a problem exists in that when the multi-value number M increases, the estimation frequency range decreases.

With the technique employing a feedback loop, meanwhile, the estimation frequency range is $-B/2 \le f_{IF} \le B/2$, and therefore, in contrast to the M multiplication method, the estimation frequency range does not decrease in accordance with the size of the multi-value number M. With this technique, however, it takes a long time for feedback to converge, and as a result, the code sequence increases in length.

In another technique (see NPL 3, for example), the estimation frequency range described above is set at $-B/2 \le f_{IF} < B/2$, which is wider than that the M multiplication method, by estimating a timing using the correlation of a typical training signal and subtracting the training signal from the reception signal. With this technique, however, it is difficult to estimate the frequency offset when an error appears in even 1 symbol during timing detection, and as a result, a timing detection code sequence increases, leading to an increase in the code sequence length.

NPL 4, meanwhile, discloses a method in which the compensation range is the same as those of NPL 2 and NPL 3, i.e. $-B/2 \le f_{IF} < B/2$, and accurate timing detection is not required.

The method disclosed in NPL 4 will be described below.

FIG. 9 is an example of a schematic block diagram showing a configuration of an optical transmission system 400 that implements the method disclosed in NPL 4. The optical transmission system 400 includes an optical transmission device 401 and an optical reception device 402. The optical transmission device 401 and the optical reception device 402 are connected communicably via an optical transmission path 403.

In the optical transmission device 401, a frame generation unit 501 takes in transmission data supplied from the outside and generates a burst frame 600 shown in FIG. 10. The burst frame 600 includes, in order from the start, respective fields for a preamble 601, a payload 602, and an end-of-burst 603. The frame generation unit 501 writes the transmission data supplied from the outside to the payload 602. Further, the frame generation unit 501 generates the burst frame 600 by writing a training code sequence for frequency offset estimation 610, which has a sequence length L and is stored in advance in an internal storage area, to the preamble 601.

An IQ signal generation unit 502 takes in the burst frame 600 generated by the frame generation unit 501 and generates a modulation signal 502out having an I component and a Q component. Here, for example, it is assumed that the IQ signal generation unit 502 generates the modulation signal by BSPK (Binary Phase shift Keying).

An optical coherent transmission unit 503 generates a transmission signal constituted by a coherent optical signal by modulating light output by an internally provided light source using the modulation signal 502out constituted by the I component and the Q component, generated by the IQ signal generation unit 502. The optical coherent transmission unit 503 transmits the generated transmission signal to the optical reception device 402 on the optical transmission path 403.

In the optical reception device 402, an optical coherent reception unit 510 performs coherent reception for measuring an interference waveform between reception light received via the optical transmission path 403 by a phase diversity method and local light output by a local oscillator 511, and outputs an analog signal constituted by an I component and a Q component.

An ADC (Analog-to-Digital Converter) 512 converts the analog signal having the I component and the Q component, output from the optical coherent reception unit 510, to a digital signal. A digital signal processing unit 513 is constituted by a DSP (Digital Signal Processor), for example. In the digital signal processing unit 513, an equalizer 531 performs adaptive equalization processing on the digital signal output by the ADC 512 and outputs a reception signal in which waveform distortion occurring during propagation, such as chromatic dispersion, polarization mode dispersion, and polarization rotation, for example, has been compensated for.

A frequency offset compensation unit 532 calculates the frequency offset amount using a training signal included in a reception signal 531out output by the equalizer 531. Further, the frequency offset compensation unit 532 performs a reverse rotation calculation on the reception signal 531out output by the equalizer 531 using the calculated frequency offset amount, and outputs a reception signal 532out from which phase rotation caused by the frequency offset has been removed.

A phase offset compensation unit 533 removes a temporally fixed phase offset component from the reception signal 532out output by the frequency offset compensation unit 532 and outputs a reception signal 533out that reproduces the constellation of the transmission signal. An output unit 514 decodes the reception signal 533out and outputs the decoded signal to the outside.

FIG. 11 is a block diagram showing an internal configuration of the frequency offset compensation unit 532. In the frequency offset compensation unit 532, a timing detection unit 730 detects the position of the training signal included in the reception signal (referred to hereafter as the reception training signal), extracts the reception training signal on the basis of the detected position, and outputs the extracted signal to a frequency offset estimation unit 721.

In a training signal analysis unit 710, a training signal generation unit 711 generates and outputs a training signal t(n) on the basis of an identical code sequence to the training code sequence for frequency offset estimation 610 having the sequence length L, which is a code sequence given in advance and written to the preamble 601 by the frame generation unit 501 of the optical transmission device 401.

The training signal analysis unit 710 calculates and outputs a deviation angle $\theta_t$ of a vector average of a one-symbol delay differential component of the training signal t(n) using a delay device 712, a complex conjugator 713, a multiplier 714, a vector averaging device 715, and an deviation angle device 716.

The frequency offset estimation unit, meanwhile, calculates a vector mean deviation angle $\theta_r$ of a one-symbol delay differential component of a reception training signal r(n) output by the timing detection unit 730 using a delay device 721, a complex conjugator 722, a multiplier 723, a vector averaging device 724, and an deviation angle device 725. A subtractor 726 calculates a phase rotation $2\pi f_{IF}T$ produced by the frequency offset component by subtracting $\theta_t$ calculated by the training signal analysis unit 710 from the calculated value $\theta_r$, and outputs the phase rotation $2\pi f_{IF}T$ to a frequency offset compensation processing unit 731. The frequency offset compensation processing unit 731 performs frequency offset compensation on the reception signal using the frequency offset amount output by the frequency offset estimation unit 721.

Here, the procedure implemented by the training signal analysis unit 710 to calculate the deviation angle $\theta_t$ of the training signal t(n) will be described. As described above, the training signal generation unit 711 generates the training signal t(n) from the training code sequence for frequency offset estimation, which is given in advance, and outputs the generated training signal t(n).

In the case of BPSK, for example, the training code sequence is a code sequence having two values, namely 0 and π, and in this case, the training signal t(n) is expj(ωt), $\exp_j(\omega t+\pi)$.

Further, in the case of QPSK (Quadrature Phase Shift Keying), the training code sequence is a code sequence having four values, namely +¼π, −¼π, +¾π, and −¾π, and in this case, the training signal t(n) is expj(ωt+¼π), expj(ωt−¼π), expj(ωt+¾π), expj(ωt−¾π).

When the training signal t(n) generated by the training signal generation unit 711 is expressed using a formula, formula (1) shown below is acquired.

[Formula 1]

$$t(n) = \exp j(\varphi_m(n)) \quad (1)$$

Further, in the case of QPSK, the training code sequence results in the training signal t(n) shown in FIG. 12(a). Note that in FIG. 12(a), reference symbols 801, 802, 803, 804, and 805 denote symbol positions for each n of the training signal t(n), while reference symbols 801p, 802p, 803p, and 804p each denote the position of the preceding symbol.

The delay device 712, having taken in a training signal t(n+1), outputs a one-symbol delay signal t(n) of the training signal t(n) taken in thereby. The complex conjugator 713 takes in t(n) output by the delay device 712 and outputs a complex conjugate t(n)* of t(n).

Note that a superscript "*" is a symbol denoting a complex conjugate. A one-symbol delay differential component $\Delta t_1(n)$ output by the multiplier 714 when the delay device 712 takes in t(n+1) is defined by formula (2) below.

[Formula 2]

$$\Delta t_1(n) = t(n+1) \cdot t(n)^* = \exp j(\varphi_m(n+1) - \varphi_m(n)) = \exp j(\Delta \theta_1(n)) \quad (2)$$

Note that in formula (2), a replacement shown below in formula (3) is performed. $\Delta \theta_1(n)$ on the left side of formula (3) is a modulation phase difference between adjacent symbols.

[Formula 3]

$$\Delta \theta_1(n) = \varphi_m(n+1) - \varphi_m(n) \quad (3)$$

Meanwhile, the reception training signal r(n) included in the reception signal taken in by the timing detection unit 730 is expressed by formula (4) below.

[Formula 4]

$$r(n) = \exp j(\varphi_m(n) + n 2\pi f_{IF} T) \quad (4)$$

As shown in formula (4), in the phase of the reception training signal r(n), the phase rotation produced by the frequency offset is superimposed on the training signal component. FIG. 12(b) is a view showing this. In FIG. 12(b), for simplicity, the frequency offset component at n=0 is set at "0". Note that in FIG. 12(b), reference symbols 801r, 802r, 803r, 804r, and 805r denote symbol positions for each n of the reception training signal r(n), while reference symbols 801t, 802t, 803t, and 804t denote the symbol positions of each n of the training signal t(n).

Likewise with respect to the reception training signal r(n), a one-symbol delay differential component is defined by formula (5) below.

[Formula 5]

$$\Delta r_1(n) = r(n+1) \cdot r(n)^*$$

$$= \exp j((n+1) \cdot 2\pi f_{IF} T + \varphi_m(n+1) - n \cdot 2\pi f_{IF} T - \varphi_m(n))$$

$$= \exp j(2\pi f_{IF} T + \varphi_m(n+1) - \varphi_m(n))$$

$$= \exp j(2\pi f_{IF} T + \Delta\theta_1(n))$$

(5)

It is evident from formula (5) that the phase of a one-symbol delay differential component $\Delta r_1(n)$ between adjacent symbols is expressed as the sum of the frequency offset component $2\pi f_{IF}T$ and the modulation phase difference $\Delta\theta_1(n)$ between adjacent symbols. Hence, the frequency offset amount can be determined from formula (6), shown below, using the deviation angle of the one-symbol delay differential component $\Delta r_1(n)$.

[Formula 6]

$$2\pi f_{IF}T = \arg[\Delta r_1(n)] - \Delta\theta_1(n),\quad (6)$$

Note that when the relationship shown in formula (6) is expressed on an IQ plane, the relationship is as shown in FIG. 13(a). Further, when the frequency offset amount is estimated using a calculation based on formula (6), the estimation range of the frequency offset amount is a range expressed by formula (7) below.

[Formula 7]

$$-\pi \leq 2\pi f_{IF}T < \pi \quad (7)$$

Hence, the frequency range in which the frequency offset amount can be estimated is as expressed by formula (8) below.

[Formula 8]

$$-\frac{B}{2} \leq f_{IF} < \frac{B}{2} \quad (8)$$

Note that in formula (8), B is the baud rate of the symbols in the transmission signal, as described above.

Hence, by removing $\Delta\theta_1(n)$ from the deviation angle of the one-symbol delay differential component $\Delta r_1(n)$ of the reception training signal r(n) from the reception signal in accordance with formula (6), the magnitude of the frequency offset component $2\pi f_{IF}T$ can be calculated. However, a noise component is superimposed on the reception signal, and therefore this noise must be removed by averaging processing.

Noise component removal by means of vector averaging will be described below. The vector average of the one-symbol delay differential component $\Delta t_1(n)$ of the training signal t(n) over the sequence length L of the training signal is expressed by formula (9) below.

[Formula 9]

$$\sum_{n=0}^{L} \Delta t_1(n) = \exp j(\theta_t) \quad (9)$$

In formula (9), $\theta_t$ is a known quantity, or more specifically a prescribed angle, determined at the point where the training signal t(n) is determined. The vector average of the one-symbol delay differential component $\Delta r_1(n)$ of the reception training signal r(n) is expressed by formula (10) below.

[Formula 10]

$$\sum_{n=0}^{L} \Delta r_1(n) = \exp j(\theta_{r1}) = \exp j(\theta_t) \cdot \exp j(2\pi f_{IF}T) \quad (10)$$

Note that when the relationship shown in formula (10) is expressed on an IQ plane, the relationship is as shown in FIG. 13(b). Hence, as shown in formula (11), a vector in which the frequency offset amount is included in the phase can be calculated.

[Formula 11]

$$\exp j(2\pi f_{IF}T) = \exp j(\theta_t)^* \cdot \sum_{n=0}^{L} \Delta r_1(n) \quad (11)$$

Formula (11) may be said to express a differential component between the vector average of the one-symbol delay differential component $\Delta r_1(n)$ of the reception training signal r(n) and the vector average of the one-symbol delay differential component $\Delta t_1(n)$ of the training signal t(n) shown in formula (9). Hence, from formula (9) and formula (11), the frequency offset amount can be calculated as shown below in formula (12).

[Formula 12]

$$2\pi f_{IF}T = \arg\sum_{n=0}^{L} \Delta r_1(n) - \arg\sum_{n=0}^{L} \Delta t_1(n) = \theta_{r1} - \theta_t \quad (12)$$

Thus, the frequency offset can be estimated from the difference between the deviation angle $\theta_{r1}$ of the vector average of the one-symbol delay differential component $\Delta r_1(n)$ of the reception training signal r(n) and the deviation angle $\theta_t$ (referred to hereafter as the prescribed deviation angle $\theta_t$), which is a prescribed angle. Here, as long as the sequence length L of the training code sequence for frequency offset estimation is sufficiently long, a sufficient averaging effect can be expected, and as a result, the precision of the estimated frequency offset improves.

However, with the method disclosed in NPL 4, described above, the sequence length L of the training code sequence for frequency offset estimation must be set at a length with which a sufficient averaging effect can be expected, and this leads to an increase in the length of the preamble, resulting in a reduction in communication efficiency.

In consideration of the circumstances described above, an object of the present invention is to provide a technique with which a frequency offset amount can be estimated with a high degree of precision in a digital coherent system using a training code sequence with a short sequence length.

Means for Solving the Problem

An aspect of the present invention is an optical receiving apparatus for receiving a coherent optical signal that includes a training signal, the optical receiving apparatus including: a timing detection unit that detects a reception training signal corresponding to a training code sequence for frequency offset estimation within a reception signal acquired by converting the received coherent optical signal into an electric signal; a frequency offset estimation unit that calculates a plurality of delay differential components on the basis of the reception training signal detected by the timing detection unit and at least two delay signals of the reception training signal, each delay signal having a different number of delay symbols, and calculates an averaged frequency offset amount using the calculated plurality of delay differential components; and a frequency offset compensation processing unit that performs frequency offset compensation on the reception signal using the frequency offset amount calculated by the frequency offset estimation unit, wherein the training code sequence for frequency offset estimation is a code sequence constituted by multi-value phase modulation symbols, in which a deviation angle of a vector average of a one-symbol delay differential component of the training signal, which is generated on the basis of the code sequence, has a prescribed angle, and a modulation phase difference between adjacent symbols has a fixed, repeated pattern.

An aspect of the present invention is the optical receiving apparatus described above, wherein a sequence length of the training code sequence for frequency offset estimation is a multiple of a number of elements included in the fixed, repeated pattern of the modulation phase difference between adjacent symbols.

An aspect of the present invention is the optical receiving apparatus described above, wherein, when the frequency offset estimation unit calculates a one-symbol delay differential component and a two-symbol delay differential component of the reception training signal, the frequency offset estimation unit calculates a first vector of a differential component between a vector average of the one-symbol delay differential component of the reception training signal and the vector average of the one-symbol delay differential component of the training signal, calculates a second vector in which a phase component of a predetermined angle, which is determined in advance on the basis of the prescribed angle and a total angle of the elements of the modulation phase difference included in the repeated pattern, has been removed from a vector of a differential component between respective vector averages of the one-symbol delay differential component and the two-symbol delay differential component of the reception training signal, and calculates the frequency offset amount by averaging the calculated first and second vectors.

An aspect of the present invention is the optical receiving apparatus described above, wherein, when the frequency offset estimation unit calculates a p (where p is an integer of at least 2) symbol delay differential component and a (p+1) symbol delay differential component of the reception training signal, the frequency offset estimation unit calculates a third vector in which a phase component of a predetermined angle, which is determined in advance on the basis of the prescribed angle, has been removed from a vector of a differential component between respective vector averages of the p-symbol delay differential component and the (p+1)-symbol delay differential component of the reception training signal, calculates the frequency offset amount by averaging the first vector, the second vector, and the third vector when p includes 2, and calculates the frequency offset amount by averaging the first vector and the third vector when p does not include 2.

An aspect of the present invention is the optical receiving apparatus described above, wherein, when the number of elements included in the fixed, repeated pattern of the modulation phase difference between adjacent symbols is set as M, p takes a value of M−1, or M, or M+1, or all of these values.

An aspect of the present invention is the optical receiving apparatus described above, wherein the timing detection unit, when detecting the reception training signal corresponding to the training code sequence for frequency offset estimation within the reception signal, detects, as the reception training signal, an interval of the reception signal including all or a part of the training code sequence for frequency offset estimation, the interval having a length that corresponds to the sequence length of the training code sequence for frequency offset estimation.

An aspect of the present invention is an optical transmitting apparatus including: a frame generation unit that generates a transmission frame by writing, to a preamble, a training code sequence that includes a training code sequence for frequency offset estimation, the training code sequence for frequency offset estimation being a code sequence constituted by multi-value phase modulation symbols, in which a deviation angle of a vector average of a one-symbol delay differential component of a signal generated on the basis of the code sequence has a prescribed angle, and a modulation phase difference between adjacent symbols has a fixed, repeated pattern; an IQ signal generation unit that generates an I component and a Q component of the transmission frame generated by the frame generation unit; and an optical coherent transmission unit that transmits a coherent optical signal acquired by performing modulation on the basis of the I component of the transmission frame and the Q component of the transmission frame, generated by the IQ signal generation unit.

An aspect of the present invention is a frequency offset estimation method including receiving a coherent optical signal that includes a training signal generated using a code sequence constituted by multi-value phase modulation symbols, in which a deviation angle of a vector average of a one-symbol delay differential component of a signal generated on the basis of the code sequence has a prescribed angle, and a modulation phase difference between adjacent symbols has a fixed, repeated pattern, detecting a reception training signal corresponding to a training code sequence for frequency offset estimation within a reception signal acquired by converting the received coherent optical signal into an electric signal, calculating a plurality of delay differential components on the basis of the detected reception training signal and at least two delay signals of the reception training signal, each delay signal having a different number of delay symbols, and calculating an averaged frequency offset amount, which is used to compensate for a frequency offset in the reception signal, using the calculated plurality of delay differential components.

Effects of the Invention

According to the present invention, a frequency offset amount can be estimated with a high degree of precision in a digital coherent system using a training code sequence with a short sequence length.

DESCRIPTION OF EMBODIMENTS

First Embodiment

Figure 1:
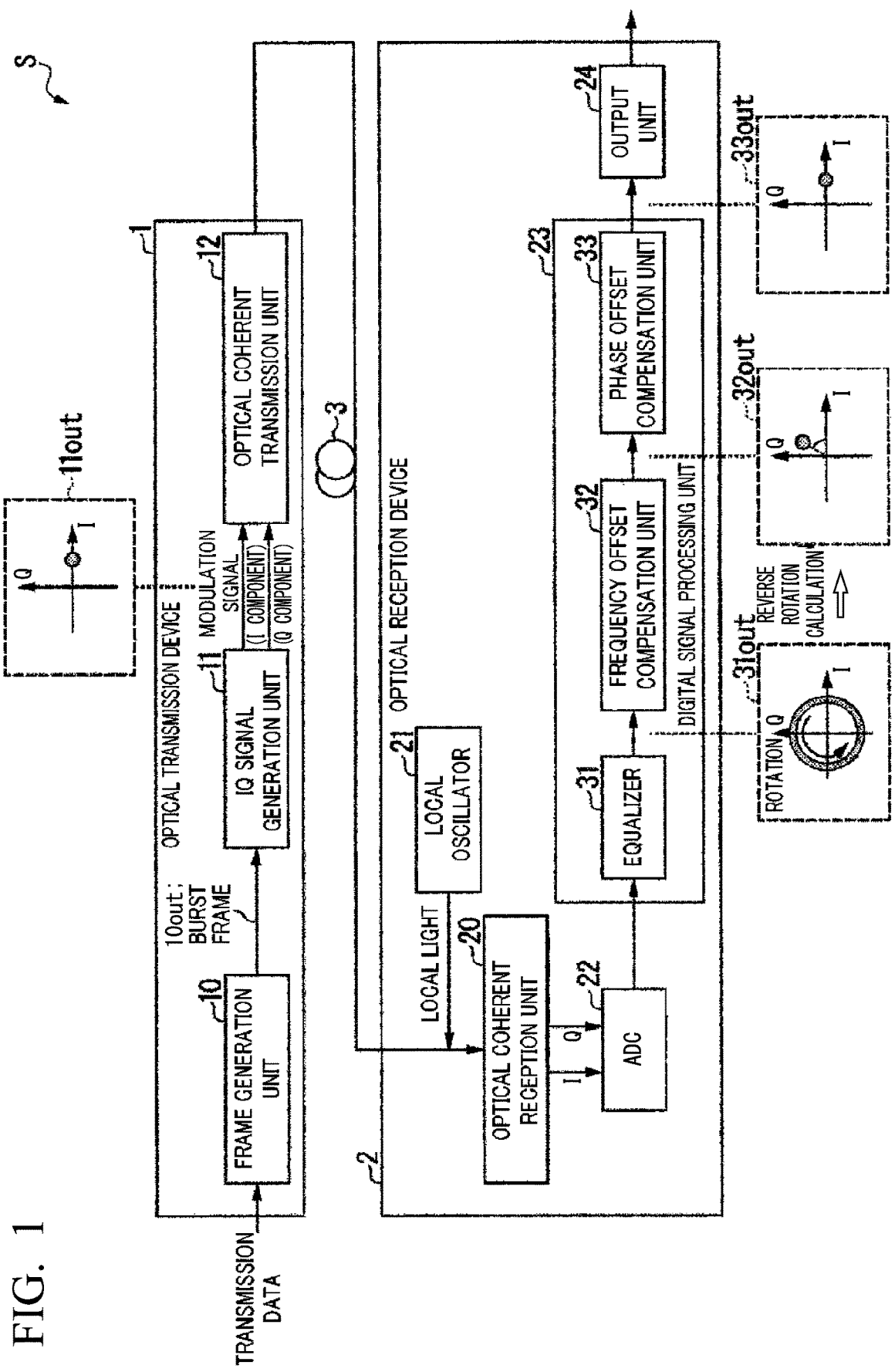
FIG. 1 is a block diagram showing a configuration of an optical transmission system according to a first embodiment of the present invention.
Figure 8:
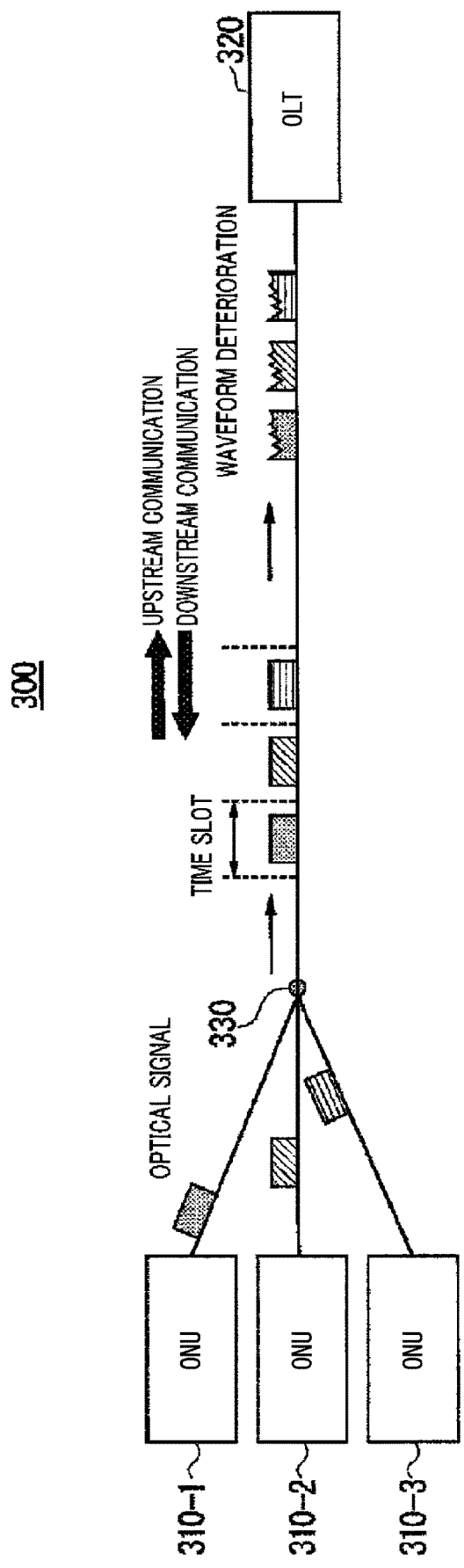
FIG. 8 is a block diagram showing a configuration of a PON system.
Figure 9:
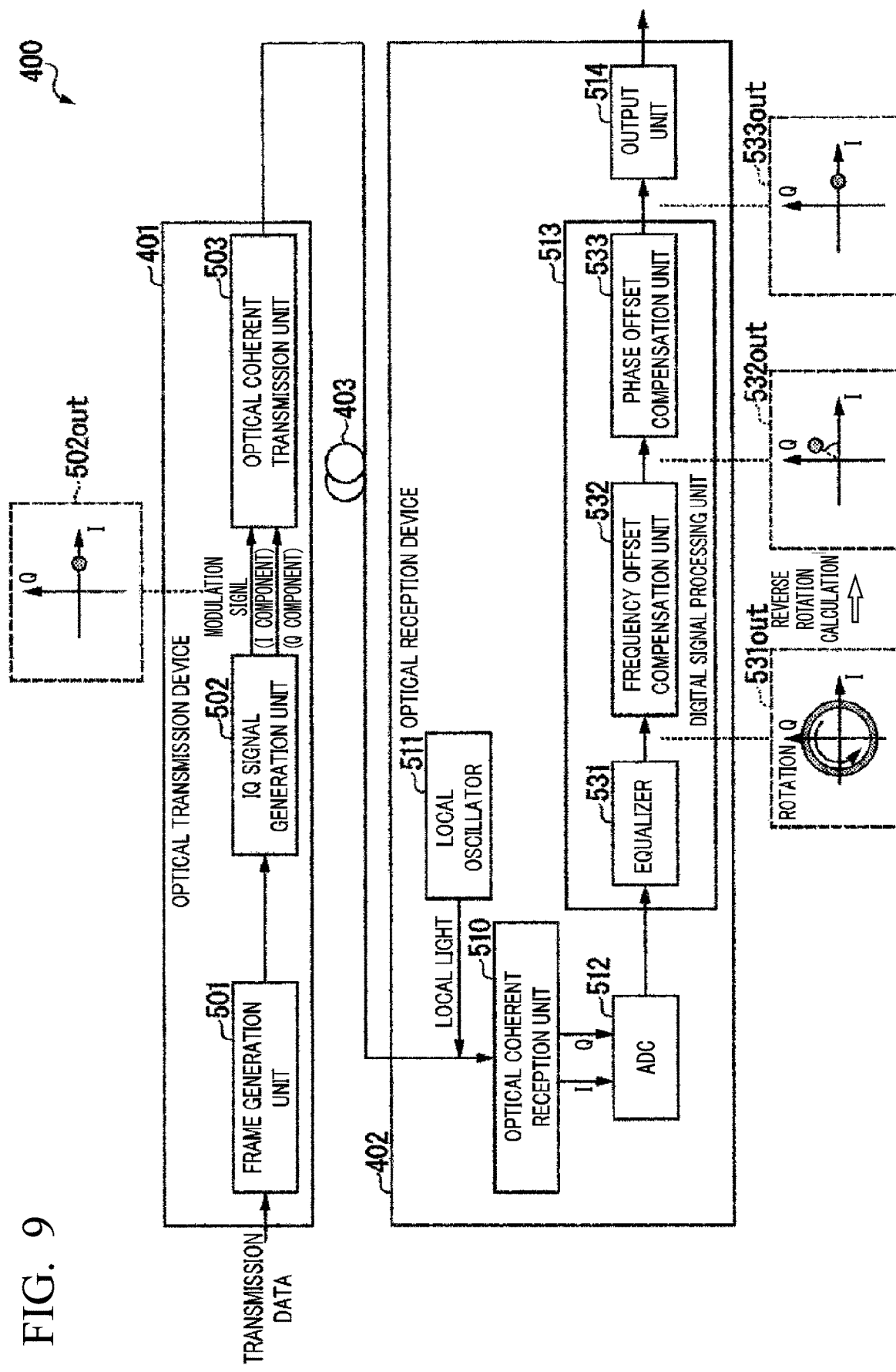
FIG. 9 is a block diagram showing a configuration of an optical transmission system for implementing the method disclosed in NPL 4.

Embodiments of the present invention will be described below with reference to the figures. FIG. 1 is a block diagram showing a configuration of an optical transmission system S according to a first embodiment. The optical transmission system S includes an optical transmission device (optical transmitting apparatus) 1, an optical reception device (optical receiving apparatus) 2, and an optical transmission path 3. For example, the optical transmission device 1 and the optical reception device 2 are provided respectively in the ONUs 310-1 to 310-3 and the OLT 320 of the optical transmission system 300 of the PON system shown in FIG. 8. The optical transmission path 3 connects the optical transmission device 1 to the optical reception device 2 so as to transmit optical signals transmitted by the optical transmission device 1 to the optical reception device 2.

Figure 10:
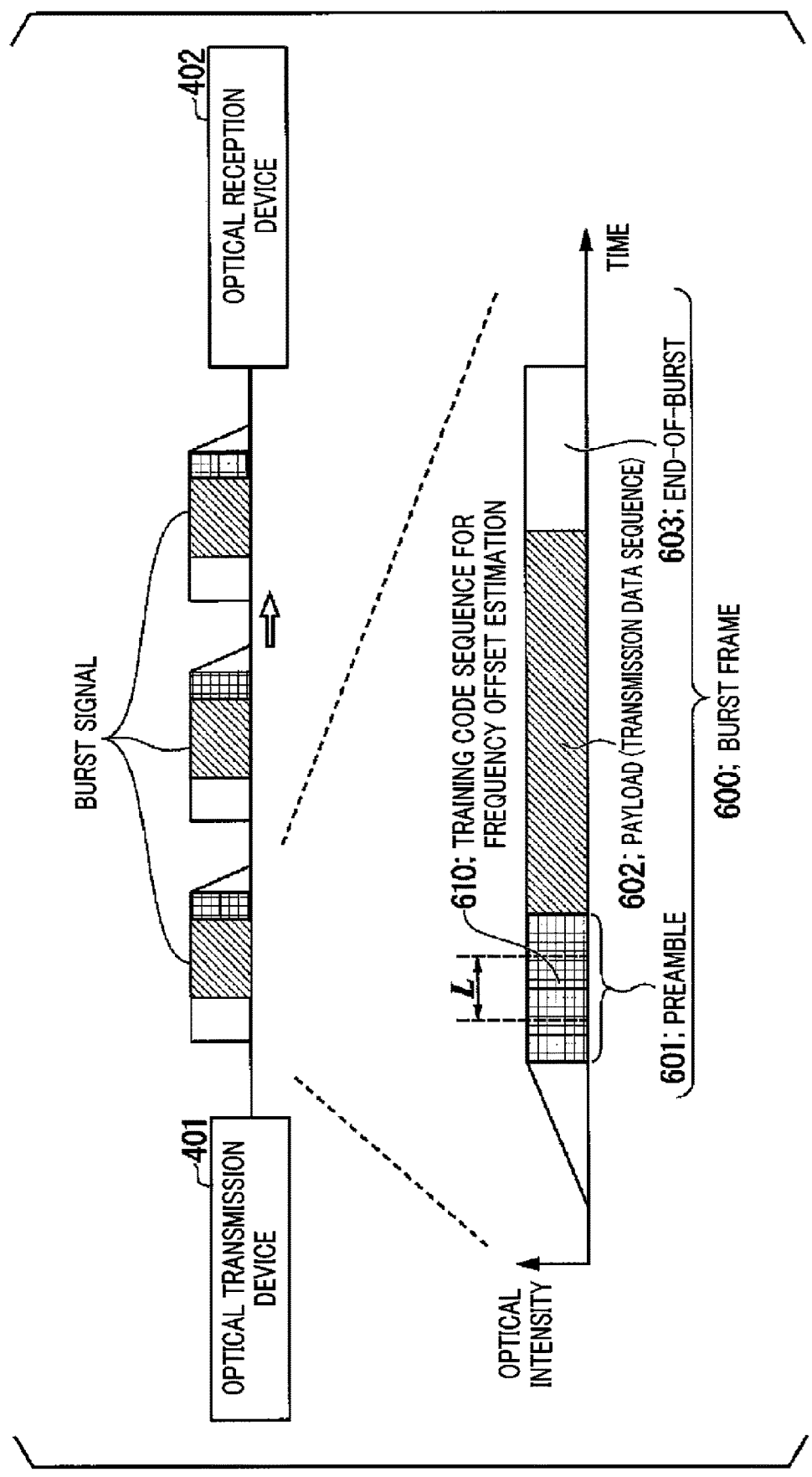
FIG. 10 is a view showing a configuration of a burst frame generated by an optical transmission device.
Figure 11:
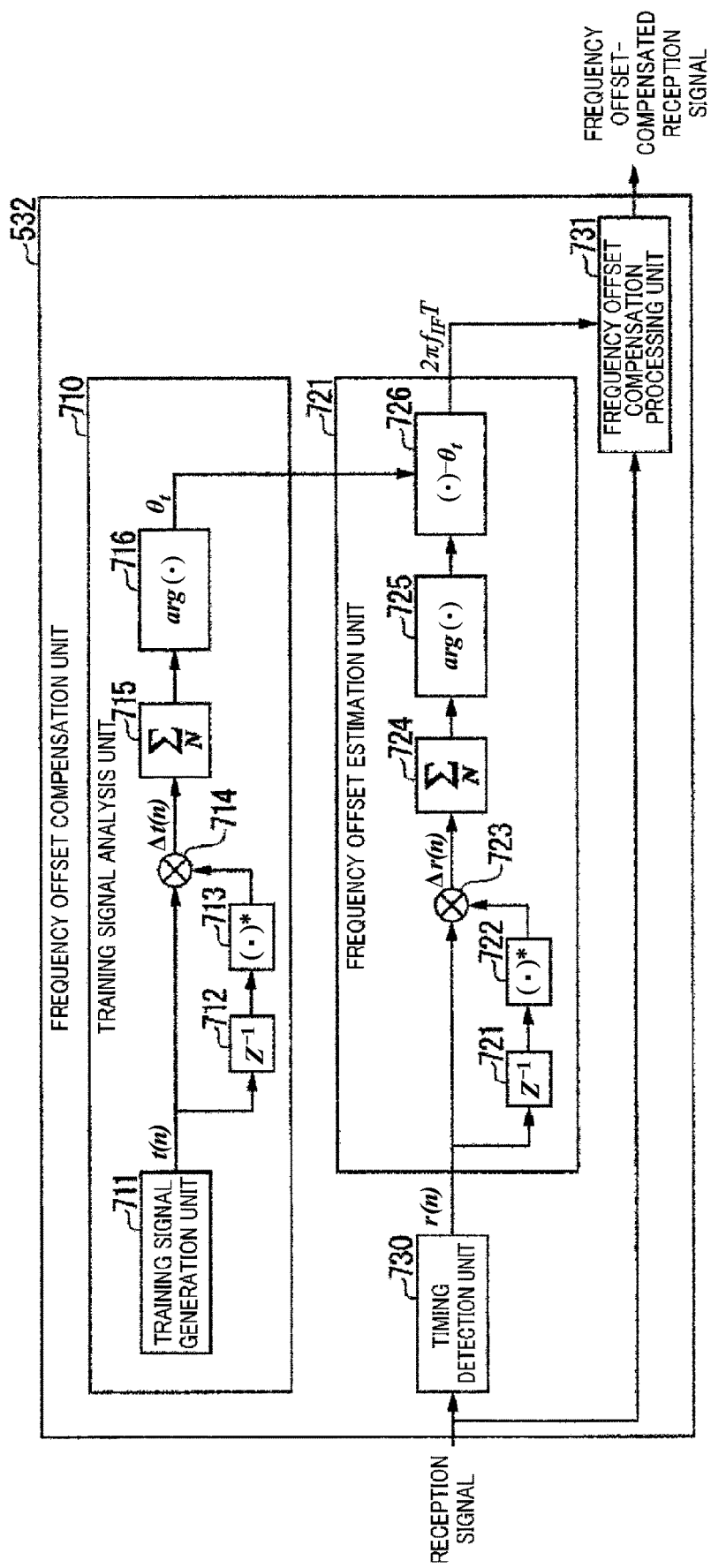
FIG. 11 is a block diagram showing an internal configuration of a frequency offset compensation unit provided in an optical reception device shown in FIG. 9.
Figure 12:
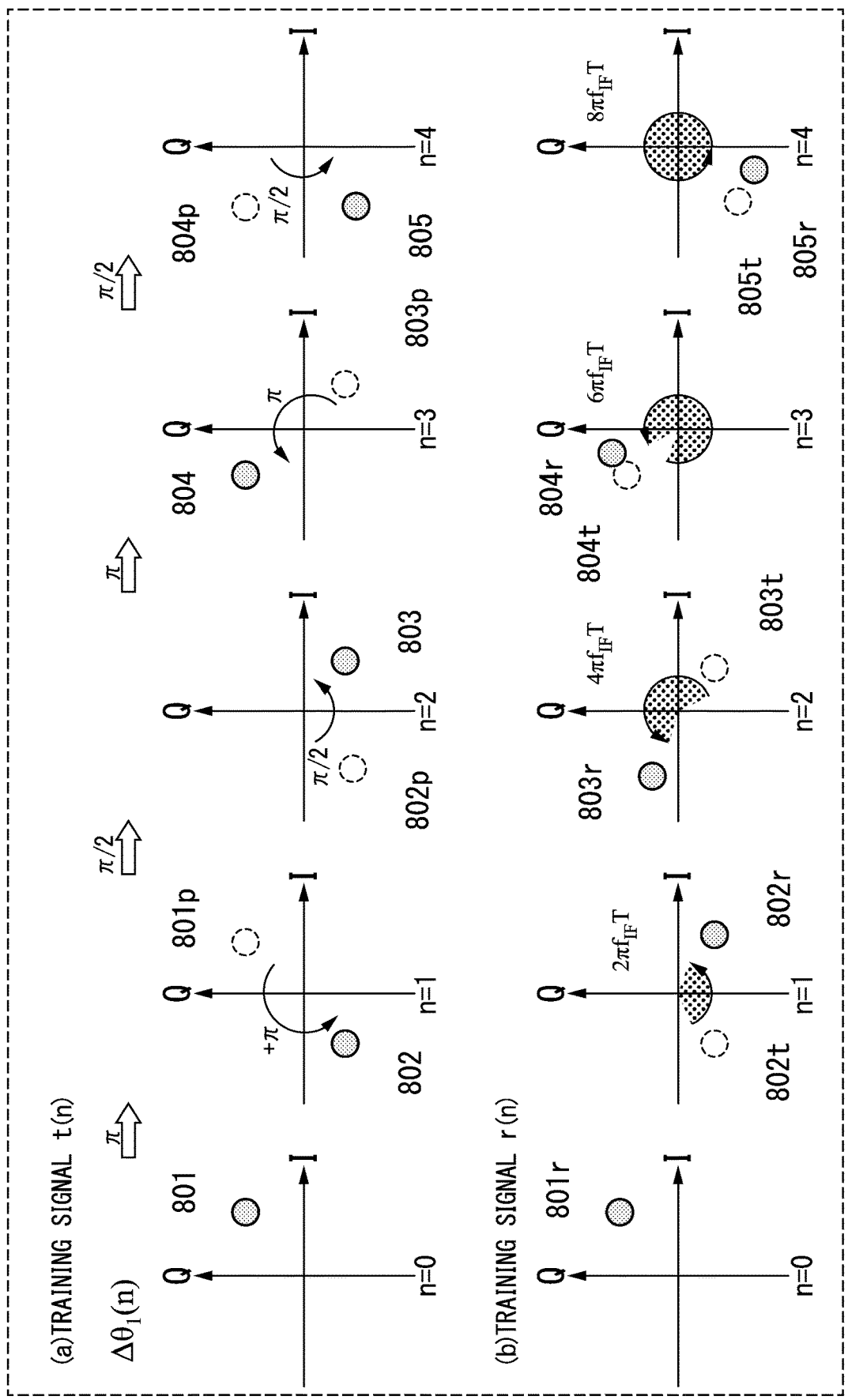
FIG. 12 is a view (1) illustrating a frequency offset amount on an IQ plane.
Figure 13:
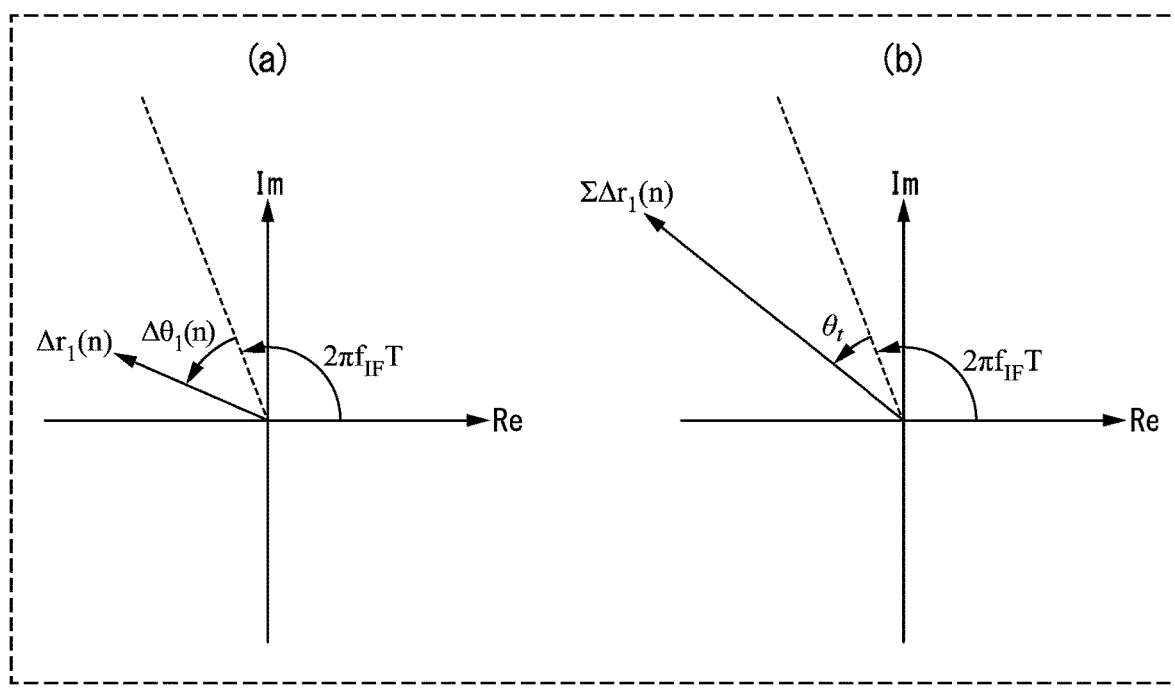
FIG. 13 is a view (2) illustrating a frequency offset amount on an IQ plane.

The optical transmission device 1 includes a frame generation unit 10, an IQ signal generation unit 11, and an optical coherent transmission unit 12. The frame generation unit 10 takes in transmission data supplied from the outside and writes the transmission data to the payload 602 of the burst frame 600 shown in FIG. 10. Further, the frame generation unit 10 generates a burst frame 10out by writing a training code sequence for frequency offset estimation of the first embodiment, which is stored in advance in an internal storage area, to the preamble 601.

The IQ signal generation unit 11 takes in the burst frame 10out generated by the frame generation unit 10 and generates a modulation signal 11out, which is constituted by an I component and a Q component, by QSPK.

The optical coherent transmission unit 12 generates a transmission signal constituted by a coherent optical signal by modulating light output by an internally provided light source using the modulation signal having the I component and the Q component, generated by the IQ signal generation unit 11. The optical coherent transmission unit 12 transmits the generated transmission signal to the optical reception device 2 on the optical transmission path 3.

The optical reception device 2 includes an optical coherent reception unit 20, a local oscillator 21, an ADC 22, a digital signal processing unit 23, and an output unit 24.

The optical coherent reception unit 20 performs coherent reception for measuring an interference waveform between reception light received via the optical transmission path 3 by a phase diversity method and local light output by the local oscillator 21, and outputs an analog signal having an I component and a Q component.

The ADC 22 converts the analog signal having the I component and the Q component from the optical coherent reception unit 20 to a digital signal. The digital signal processing unit 23 is constituted by a DSP, for example, and includes an equalizer 31, a frequency offset compensation unit 32, and a phase offset compensation unit 33. The equalizer 31 performs adaptive equalization processing on the digital signal output by the ADC 22 and outputs a reception signal 31out in which waveform distortion occurring during propagation, such as chromatic dispersion, polarization mode dispersion, and polarization rotation, for example, has been compensated for.

The frequency offset compensation unit 32 calculates a frequency offset amount using a training signal included in the reception signal 31out output by the equalizer 31. Further, the frequency offset compensation unit 32 performs a reverse rotation calculation on the reception signal 31out output by the equalizer 31 using the calculated frequency offset amount, and outputs a reception signal 32out from which phase rotation of the frequency offset has been removed.

The phase offset compensation unit 33 removes a temporally fixed phase offset component from the reception signal 32out output by the frequency offset compensation unit 32 and outputs a reception signal 33out that reproduces the constellation of the transmission signal. The output unit 24 decodes the reception signal 33out and outputs the decoded signal to the outside.

Figure 2:
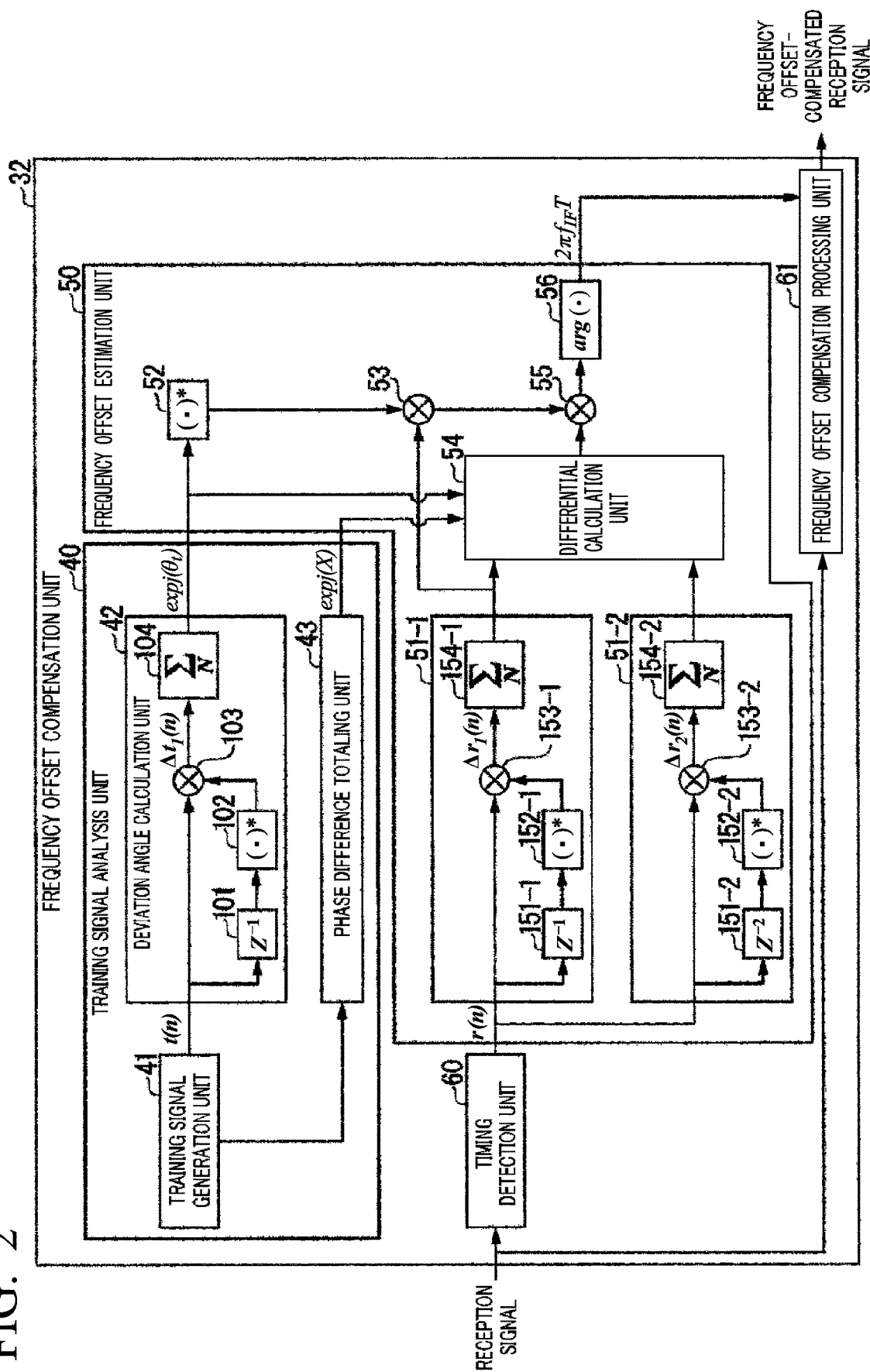
FIG. 2 is a block diagram showing an internal configuration of a frequency offset compensation unit of the first embodiment.

FIG. 2 is a block diagram showing an internal configuration of the frequency offset compensation unit 32. The frequency offset compensation unit 32 includes a training signal analysis unit 40, a frequency offset estimation unit 50, a timing detection unit 60, and a frequency offset compensation processing unit 61.

The training signal analysis unit 40 includes a training signal generation unit 41, a deviation angle calculation unit 42, and a phase difference totaling unit 43. In the training signal analysis unit 40, the training signal generation unit 41 stores, in advance in an internal storage area, the training code sequence for frequency offset estimation of the first embodiment, which is identical to the code sequence written to the preamble 601 by the frame generation unit 10 of the optical transmission device 1.

Figure 3:
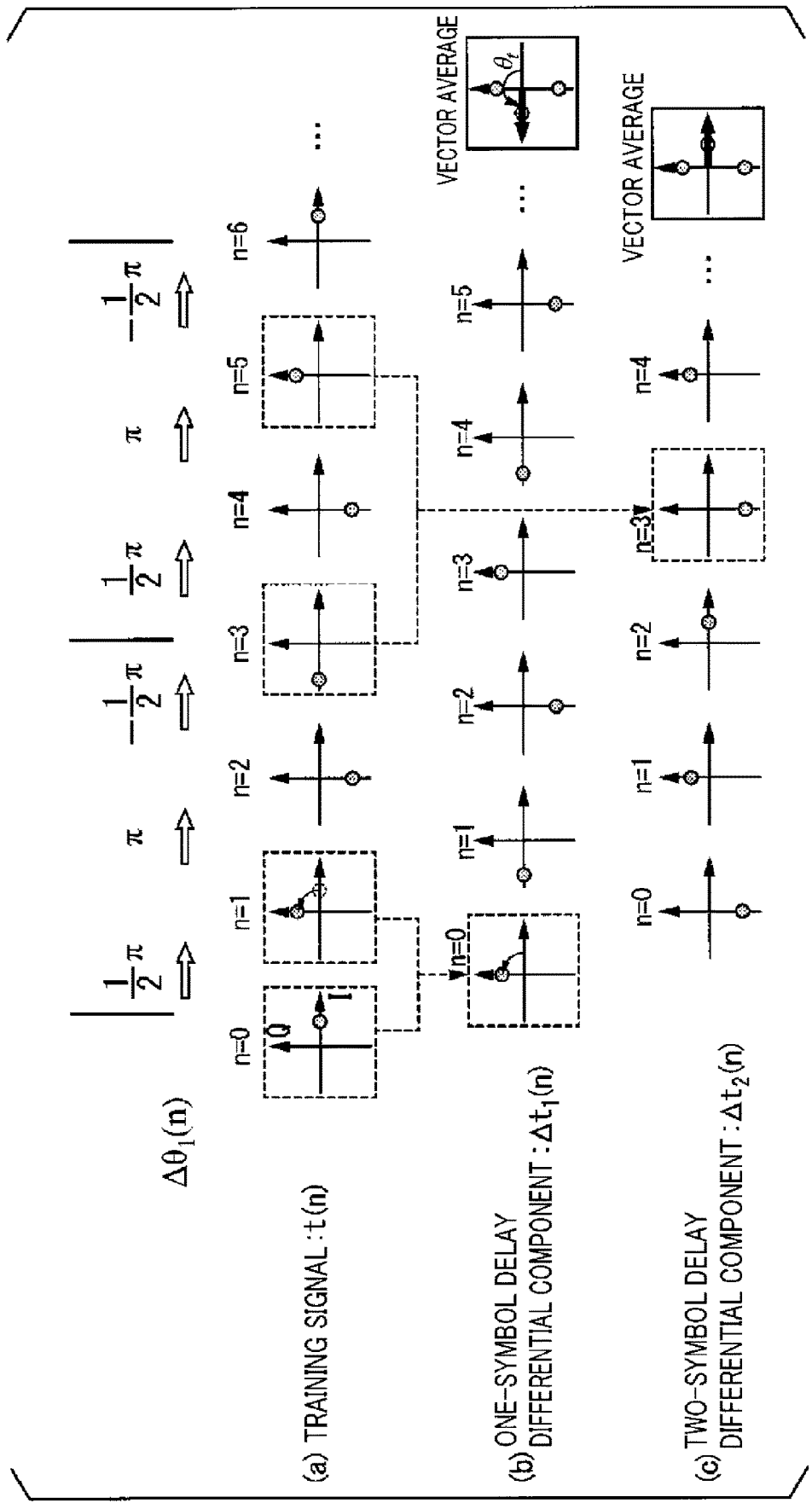
FIG. 3 is a view illustrating a training code sequence for frequency offset estimation applied to the first embodiment.

Here, the training code sequence for frequency offset estimation of the first embodiment will be described. FIG. 3(a) shows an example of the training signal t(n) generated from the training code sequence for frequency offset estimation of the first embodiment. As shown in FIG. 3(a), the modulation phase difference 401(n) between adjacent symbols of the training code sequence for frequency offset estimation of the first embodiment has a repeated pattern constituted by three elements, namely "(½)π", "π", and "−(½)π". Note that the sequence length of the training code sequence for frequency offset estimation is set at L.

Further, the training signal generation unit 41 stores "3", which represents the number of elements included in the repeated pattern of the modulation phase difference $\Delta\theta_1(n)$, as described above, in advance in the internal storage area together with the training code sequence for frequency offset estimation. Furthermore, the training signal generation unit 41 generates and outputs the training signal t(n) on the basis of the training code sequence for frequency offset estimation of the first embodiment, stored in the internal storage area.

Note that the training code sequence for frequency offset estimation of the first embodiment and the number of elements included in the repeated pattern of the modulation phase difference $\Delta\theta_1(n)$ are assumed to be stored in advance in the internal storage area of the training signal generation unit 41 by following means. For example, the optical reception device 2 receives the training code sequence for frequency offset estimation and the number of elements from the optical transmission device 1 over a separate communication line having a high communication quality, or the optical reception device 2 takes in information indicating the training code sequence for frequency offset estimation and the number of elements by means such as reading the information from a recording medium. The training signal generation unit 41 writes the information indicating the training code sequence for frequency offset estimation and the number of elements, taken in thereby, to the internal storage area so that the information is stored therein in advance.

The deviation angle calculation unit 42 includes a one-symbol delay device 101, a complex conjugator 102, a multiplier 103, and a vector averaging device 104. In the deviation angle calculation unit 42, the one-symbol delay device 101, having taken in the training signal t(n+1), outputs the one-symbol delay signal t(n) of the training signal t(n+1). The complex conjugator 102 outputs a signal of a complex conjugate of the signal taken in thereby. The multiplier 103 multiplies the two signals taken in thereby, i.e. t(n+1) and the complex conjugate of t(n), and outputs a multiplication result. The vector averaging device 104 determines and outputs a vector average by calculating the sum of the vectors in the range of the sequence length L of the training code sequence for frequency offset estimation.

In other words, the deviation angle calculation unit 42 calculates the one-symbol delay difference component $\Delta t_1(n)$ defined by formula (2) using the one-symbol delay device 101, the complex conjugator 102, and the multiplier 103. The vector averaging device 104 calculates the vector average of the one-symbol delay difference component $\Delta t_1(n)$, or in other words expj($\theta_t$), which is a vector in which the predetermined deviation angle $\theta_t$ is included in the phase, by performing the calculation shown in formula (9), and outputs the calculation result to the frequency offset estimation unit 50.

The phase difference totaling unit 43 reads the information indicating the training code sequence for frequency offset estimation and the number of elements included in the repeated pattern of the modulation phase difference $\Delta\theta_1(n)$, which are stored in the internal storage area of the training signal generation unit 41. In the first embodiment, the number of elements is "3", and therefore the phase difference totaling unit 43 calculates a sum "X" of the modulation phase differences 401(n) of the training code sequence for frequency offset estimation in three consecutive symbols on the basis of formula (13) below. Further, the phase difference totaling unit 43 outputs expj(X), which is a vector in which the calculated value "X" is included in the phase. Note that in formula (13), "c" is a predetermined arbitrary integer, and X takes a fixed value regardless of n. In the case of the training signal t(n) of FIG. 3(a), X=(½)π+π−(½)π=

[Formula 13]

$$X = \sum_{n=c}^{c+2} \Delta\theta_1(n) \tag{13}$$

The timing detection unit 60 takes in the reception signal 31out output by the equalizer 31 and detects, in the reception signal 31out taken in thereby, the start position of the reception training signal r(n) corresponding to the training code sequence for frequency offset estimation written to the preamble 601. Further, the timing detection unit 60 extracts the reception training signal r(n) from the reception signal 31out on the basis of the detected start position and the sequence length L of the training code sequence for frequency offset estimation, and outputs the extracted signal to the frequency offset estimation unit 50.

The frequency offset estimation unit 50 includes a one-symbol delay differential component vector average calculation unit 51-1, a two-symbol delay differential component vector average calculation unit 51-2, a complex conjugator 52, a multiplier 53, a differential calculation unit 54, an adder 55, and a deviation angle device 56.

In the frequency offset estimation unit 50, the one-symbol delay differential component vector average calculation unit 51-1 includes a one-symbol delay device 151-1, a complex conjugator 152-1, a multiplier 153-1, and a vector averaging device 154-1. The two-symbol delay differential component vector average calculation unit 51-2 includes a two-symbol delay device 151-2, a complex conjugator 152-2, a multiplier 153-2, and a vector averaging device 154-2.

In the one-symbol delay differential component vector average calculation unit 51-1, the one-symbol delay device 151-1, having taken in the reception training signal r(n+1), outputs the one-symbol delay signal r(n) of the reception training signal r(n+1). In the two-symbol delay differential component vector average calculation unit 51-2, the two-symbol delay device 151-2, having taken in a reception training signal r(n+2), outputs a two-symbol delay signal r(n) of the reception training signal r(n+2).

The complex conjugators 152-1 and 152-2 respectively output signals of the complex conjugates of the signals taken in by the one-symbol delay differential component vector average calculation unit 51-1 and the two-symbol delay differential component vector average calculation unit 51-2, i.e. r(n) and r(n). The multiplier 153-1 multiplies the two signals taken in thereby, i.e. r(n+1) and the complex conjugate of r(n), and outputs a multiplication result. 153-2 multiplies the two signals taken in thereby, i.e. r(n+2) and the complex conjugate of r(n), and outputs a multiplication result. The vector averaging devices 154-1, 154-2 determine and output vector averages by calculating the sum of the vectors in the range of the sequence length L of the training code sequence for frequency offset estimation.

In other words, the one-symbol delay differential component vector average calculation unit 51-1 calculates the one-symbol delay differential component $\Delta r_1(n)$ of the reception training signal r(n) by performing the calculation shown in formula (5) using the one-symbol delay device 151-1, the complex conjugator 152-1, and the multiplier 153-1. The vector averaging device 154-1 calculates the sum of $\Delta r_1(n)$ added over the sequence length L as the vector average of the one-symbol delay differential component $\Delta r_1(n)$.

Further, the two-symbol delay differential component vector average calculation unit 51-2 calculates a two-symbol delay differential component $\Delta r_2(n)$ of the reception training signal r(n) using the two-symbol delay device 151-2, the complex conjugator 152-2, and the multiplier 153-2. The vector averaging device 154-2 calculates the sum of the two-symbol delay differential component $\Delta r_2(n)$ added over the sequence length L as the vector average of the two-symbol delay differential component $\Delta r_2(n)$.

The complex conjugator 52 takes in the output value $\exp j(\theta_t)$ output by the deviation angle calculation unit 42 of the training signal analysis unit 40, and outputs $\exp j(-\theta_t)$ as the complex conjugate of the output value. The multiplier 53 performs the calculation shown in formula (11) by multiplying the output value of the one-symbol delay differential component vector average calculation unit 51-1 by the output value of the complex conjugator 52, and in so doing calculates a vector in which the frequency offset amount is included in the phase.

The differential calculation unit 54 takes in the output value of the one-symbol delay differential component vector average calculation unit 51-1, the output value of the two-symbol delay differential component vector average calculation unit 51-2, $\exp j(X)$, output by the phase difference totaling unit 43, and the output value $\exp j(\theta_t)$ output by the deviation angle calculation unit 42. Further, the differential calculation unit 54 calculates a vector in which a predetermined angle, which is determined in advance on the basis of $\exp j(X)$, output by the phase difference totaling unit 43, and the output value $\exp j(\theta_t)$ output by the deviation angle calculation unit 42, is included in the phase. Furthermore, the differential calculation unit 54 calculates a differential component between the output value of the one-symbol delay differential component vector average calculation unit 51-1 and the output value of the two-symbol delay differential component vector average calculation unit 51-2. Moreover, the differential calculation unit 54 removes the aforesaid predetermined angle from the differential component by multiplying the complex conjugate of the vector in which the predetermined angle is included in the phase by the calculated differential component, and in so doing calculates a vector in which the frequency offset amount is included in the phase.

The adder 55 adds the output value of the multiplier 53 to the output value of the differential calculation unit 54 and outputs an addition value. The deviation angle device 56 calculates the deviation angle of the addition value output by the adder 55, or in other words the frequency offset amount, and outputs the result to the frequency offset compensation processing unit 61. The frequency offset compensation processing unit 61 performs frequency offset compensation on the reception signal using the frequency offset amount output by the frequency offset estimation unit 50.

(Principles of Frequency Offset Amount Estimation According to First Embodiment)

Here, the principles by which the frequency offset estimation unit 50 estimates the frequency offset amount in the first embodiment will be described. The two-symbol delay differential component $\Delta t_2(n)$ of the training signal t(n) is defined by formula (14), shown below, similarly to formula (2) for calculating the one-symbol delay differential component.

[Formula 14]

$$\Delta t_2(n) = t(n+2) \cdot t(n)^* \quad (14)$$
$$= \exp j(\varphi_m(n+2) - \varphi_m(n))$$
$$= \exp j(\Delta\theta_2(n))$$

The two-symbol delay differential component $t_2(n)$ can also be expressed by formula (15) below.

[Formula 15]

$$\Delta t_2(n) = \{t(n+1) \cdot t(n)^*\} \cdot \{t(n+2) \cdot t(n+1)^*\} \cdot \quad (15)$$
$$\{t(n+3) \cdot t(n+2)^*\} \cdot \{t(n+3) \cdot t(n+2)^*\}^*$$
$$= \exp j(\Delta\theta_1(n) + \Delta\theta_1(n+1) + \Delta\theta_1(n+2) - \Delta\theta_1(n+2))$$

Here, a relationship shown below in formula (16) is established by formula (13).

[Formula 16]

$$\exp j(X) = \exp j\left(\sum_{n=c}^{c+2} \Delta\theta_1(n)\right) \quad (16)$$

When c=n is set in formula (16), formula (16) becomes formula (17) below.

[Formula 17]

$$\exp j(X) = \exp j(\Delta\theta_1(n) + \Delta\theta_1(n+1) + \Delta\theta_1(n+2)) \quad (17)$$

Formula (18), shown below, can be derived from formula (15) and formula (17).

[Formula 18]

$$\Delta t_2(n) = \exp j(X - \Delta\theta_1(n+2)) = \exp j(\Delta\theta_2(n)) \quad (18)$$

The two-symbol delay differential component $\Delta r_2(n)$ of the reception training signal including the frequency offset, resulting from formula (4), is defined by formula (19), shown below.

[Formula 19]

$$\Delta r_2(n) = r(n+2) \cdot r(n)^* \quad (19)$$
$$= \exp j((n+2)2\pi f_{IF}T + \varphi_m(n+2) -$$
$$\{(n2\pi f_{IF}T + \varphi_m(n))\})$$
$$= \exp j(2 \cdot 2\pi f_{IF}T + \Delta\theta_2(n))$$

From formula (18) and formula (19), formula (20), shown below, is established in relation to the two-symbol delay differential component $\Delta r_2(n)$.

[Formula 20]

$$\Delta r_2(n) = \exp j(2 \cdot 2\pi f_{IF}T + X - \Delta\theta_1(n+2)) \quad (20)$$

When the vector average is calculated as the sum of the two-symbol delay differential component $\Delta r_2(n)$ shown in formula (20) added over the length of the sequence length L, formula (21), shown below, can be derived from similar considerations to formula (10).

[Formula 21]

$$\sum_{n=0}^{L} \Delta r_1(n) \cong \exp j(-\theta_t + X) \cdot \exp j(2 \cdot 2\pi f_{IF} T) \quad (21)$$

As n increases, the third term "$\Delta\theta_1(n+2)$" of the phase in formula (20) shows identical variation to the one-symbol delay differential component $\Delta t_1(n)$ of the training signal t(n). Therefore, the third term in parentheses following expj, when added over a sufficiently long sequence length L, takes the value acquired by adding the one-symbol delay differential component $\Delta t_1(n)$ over the sequence length L, or in other words, according to formula (9), "$\theta_t$". Thus, formula (21) can be derived.

The differential component between the vector average of the two-symbol delay differential component, calculated using formula (21), and the vector average of the one-symbol delay differential component, calculated using formula (10), is $\exp j(2\pi f_{IF} T + X - 2\theta_t)$. Here, the predetermined angle is set as $(X - 2\theta_t)$, and by multiplying a vector $\exp j(-X + 2\theta_t)$, which is the complex conjugate of the vector in which the predetermined angle is included in the phase, by the differential component, as shown below in formula (22), the predetermined angle $(X - 2\theta_t)$ is removed from the differential component.

[Formula 22]

$$\sum_{n=0}^{L} \Delta r_2(n) \cdot \left\{ \sum_{n=0}^{L} \Delta r_1(n) \right\}^* \cdot \exp j(X)^* \cdot \exp j(2\theta_t) = \\ \sum_{n=0}^{L} \Delta r_2(n) \cdot \left\{ \sum_{n=0}^{L} \Delta r_1(n) \right\}^* \cdot \exp j(-X + 2\theta_t) = \exp j(2\pi f_{IF} T) \quad (22)$$

By performing the calculation of formula (22), similarly to formula (11), a vector in which the frequency offset amount is included in the phase can be calculated.

To acquire a vector in which the frequency offset amount is included in the phase on the basis of formula (22), the training code sequence for frequency offset estimation must take the following form.

The code sequence must be set so that when the vector average of the one-symbol delay differential component $\Delta r_1(n)$ of the reception training signal r(n) is calculated on the basis of formula (10), the calculated vector average does not reach zero, that is, a vector remains.

Further, to acquire a vector in which the frequency offset amount is included in the phase on the basis of formula (11), the training code sequence for frequency offset estimation must take the following form. That is, the deviation angle of the vector average of the one-symbol delay differential component $\Delta t_1(n)$ of the training signal t(n) must not be zero. The deviation angles must strengthen each other rather than canceling each other out on an IQ plane. The deviation angle must have a prescribed angle of $\theta_t$. In addition, the code sequence must be constituted by a repeated, fixed pattern. When the vector average of the one-symbol delay differential component $\Delta t_1(n)$ reaches zero, a noise component caused by an error included in the reception training signal r(n) increases, and as a result, $\theta_{r1}$ in formula (12) takes a random value, making it difficult to calculate the frequency offset amount by calculation.

In the training code sequence for frequency offset estimation of the first embodiment, an example of which is shown in FIG. 3(a), a pattern in which the modulation phase difference $\Delta\theta_1(n)$ between adjacent symbols is constituted by three elements, namely "(½)π", "π", and "−(½)π", occurs repeatedly. In other words, as shown in FIG. 3(b), the one-symbol delay differential component $\Delta t_1(n)$ of the training signal t(n), shown in FIG. 3(a), takes a form in which the fixed code sequence "(½)π", "π", "−(½)π" occurs repeatedly. Accordingly, the training code sequence for frequency offset estimation is also a fixed, repeated pattern constituted by six elements, namely "0", "(½)π", "−(½)π", "π", "−(½)π", and "(½)π".

In the case of this code sequence, when the sequence length L is a multiple of "3", i.e. the number of elements in the repeated pattern of the modulation phase difference $\Delta\theta_1(n)$, or is sufficiently large, as shown in FIG. 3(b), the deviation angle of the vector average of the one-symbol delay differential component $\Delta t_1(n)$ of the training signal t(n), or in other words the prescribed deviation angle $\theta_t$, does not reach zero, and instead equals "π" such that a vector remains. Accordingly, a vector remains likewise in the vector average of the one-symbol delay differential component $\Delta r_1(n)$ of the reception training signal r(n) shown in formula (10), and as a result, a vector in which the frequency offset amount is included in the phase is acquired on the basis of formula (11) and formula (22).

When noise is ignored, formula (11) and formula (22) are vectors having identical deflection angles. In actuality, however, formula (11) and formula (22) include different noise components. Therefore, by adding together formula (11) and formula (22) and averaging the result, the noise component can be reduced. Thus, the frequency offset can be estimated with a higher precision than when only formula (11) is used, or in other words when the method of NPL 4, which employs only the one-symbol delay differential component, is used.

Therefore, when the frequency offset is estimated with a similar degree of precision to the method of NPL 4 using the frequency offset compensation unit 32 of the first embodiment, the length of the training code sequence for frequency offset estimation can be shortened in comparison with the method of NPL 4.

(Processing of Frequency Offset Estimation Unit of First Embodiment)

Figure 4:
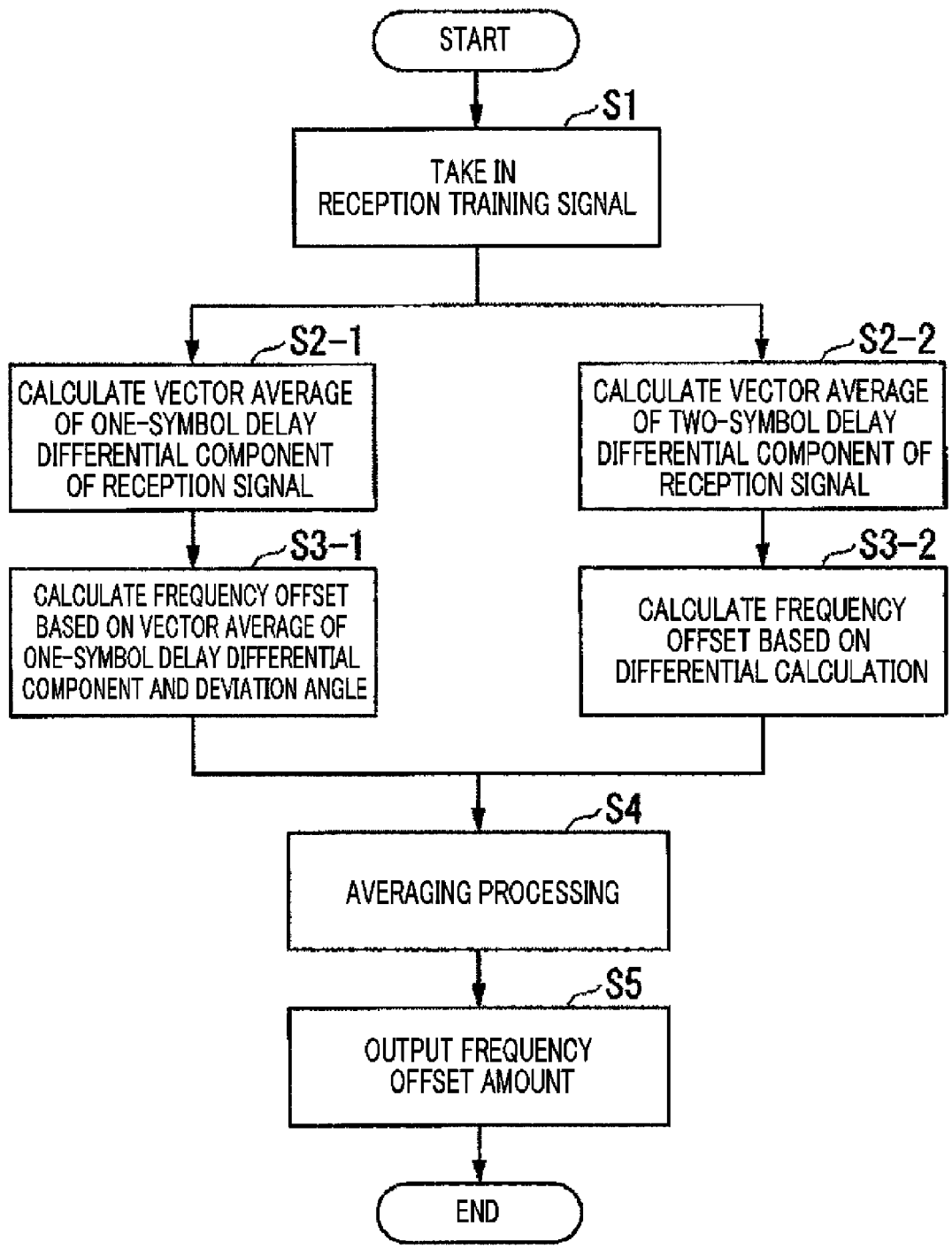
FIG. 4 is a flowchart showing a flow of processing executed by the frequency offset compensation unit of the first embodiment.

Next, the processing performed by the frequency offset estimation unit 50 of the first embodiment will be described. FIG. 4 is a flowchart showing the flow of the processing performed by the frequency offset estimation unit 50. It is assumed that prior to the start of the processing shown in FIG. 4, the deviation angle calculation unit 42 of the training signal analysis unit 40 calculates $\exp j(\theta_t)$ as a vector in which the prescribed deviation angle $\theta_t$ is included in the phase on the basis of the training signal t(n) generated by the training signal generation unit 41, and outputs the calculation result to the frequency offset estimation unit 50. It is also assumed that the phase difference totaling unit 43 of the training signal analysis unit 40 calculates X on the basis of formula (13), calculates expj(X) as a vector in which X is included in the phase, and outputs expj(X) to the frequency offset estimation unit 50. As noted above, in the case of the training signal t(n) shown in FIG. 3(a), $\theta_t = \pi$ and X=π.

The one-symbol delay differential component vector average calculation unit 51-1 and the two-symbol delay differential component vector average calculation unit 51-2 of the frequency offset estimation unit 50 take in the reception training signals r(n) output successively by the timing detection unit 60 (step S1).

The one-symbol delay device 151-1, complex conjugator 152-1, and multiplier 153-1 of the one-symbol delay differential component vector average calculation unit 51-1, having taken in the reception training signal r(n+1), calculate the one-symbol delay differential component $\Delta r_1(n)$ of the reception training signal by performing the calculation of formula (5). The vector averaging device 154-1 calculates the sum of the one-symbol delay differential component $\Delta r_1(n)$ of the reception training signal added over the sequence length L as the vector average of the one-symbol delay differential component of the reception training signal. The vector averaging device 154-1 outputs the calculated vector average of the one-symbol delay differential component of the reception training signal to the multiplier 53 and the differential calculation unit 54 (step S2-1).

The two-symbol delay device 151-2, complex conjugator 152-2, and multiplier 153-2 of the two-symbol delay differential component vector average calculation unit 51-2, having taken in the reception training signal r(n+2), calculate the two-symbol delay differential component $\Delta r_2(n)$ of the reception training signal by performing the calculation of formula (19). The vector averaging device 154-2 calculates the sum of the two-symbol delay differential component $\Delta r_2(n)$ of the reception training signal added over the sequence length L as the vector average of the two-symbol delay differential component of the reception training signal. The vector averaging device 154-2 outputs the calculated vector average of the two-symbol delay differential component of the reception training signal to the differential calculation unit 54 (step S2-2).

The complex conjugator 52 outputs the complex conjugate $\exp j(-\theta_t)$ of $\exp j(\theta_t)$, output by the deviation angle calculation unit 42 of the training signal analysis unit 40, to the multiplier 53. The multiplier 53 performs the calculation of formula (11) on the basis of the vector average of the one-symbol delay differential component of the reception training signal, output by the one-symbol delay differential component vector average calculation unit 51-1, and $\exp j(-\theta_t)$, output by the complex conjugator 52, and outputs the calculation result to the adder 55 (step S3-1).

The differential calculation unit 54 takes in the output value of the one-symbol delay differential component vector average calculation unit 51-1, the output value of the two-symbol delay differential component vector average calculation unit 51-2, $\exp j(X)$, output by the phase difference totaling unit 43, and the output value $\exp j(\theta_t)$ output by the deviation angle calculation unit 42.

The differential calculation unit 54 calculates a vector in which a predetermined angle $(X-2\theta_t)$, which is determined in advance on the basis of $\exp j(X)$, output by the phase difference totaling unit 43, and the output value $\exp j(\theta_t)$ output by the deviation angle calculation unit 42, is included in the phase. The differential calculation unit 54 performs the calculation shown in formula (22), or in other words calculates the differential component between the output value of the one-symbol delay differential component vector average calculation unit 51-1 and the output value of the two-symbol delay differential component vector average calculation unit 51-2. The differential calculation unit 54 removes the predetermined angle from the differential component by multiplying $\exp j(-X+2\theta_t)$, which is the complex conjugate of the vector in which the predetermined angle is included in the phase, by the calculated differential component, and in so doing calculates a vector in which the frequency offset amount is included in the phase (step S3-2).

The adder 55 performs a calculation shown below on the left side of formula (23) to add the output value of the multiplier 53 to the output value of the differential calculation unit 54, and outputs an addition value (step S4).

[Formula 23]

$$\sum_{n=0}^{L} \Delta r_2(n) \cdot \left\{ \sum_{n=0}^{L} \Delta r_1(n) \right\}^* \cdot \exp j(-X + 2\theta_t) + \exp j(-\theta_t) \cdot \sum_{n=0}^{L} \Delta r_1(n) = \qquad (23)$$
$$2 \cdot \exp j(2\pi f_{IF} T)$$

The deviation angle device 56 performs a calculation shown below in formula (24) to calculate the deviation angle of the addition value output by the adder 55, thereby calculating the frequency offset amount, and outputs the calculated frequency offset amount to the frequency offset compensation processing unit 61 (step S5).

[Formula 24]

$$2\pi f_{IF} T = \arg \left[ \sum_{n=0}^{L} \Delta r_2(n) \cdot \left\{ \sum_{n=0}^{L} \Delta r_1(n) \right\}^* \cdot \exp j(-X + 2\theta_t) + \exp j(-\theta_t) \cdot \sum_{n=0}^{L} \Delta r_1(n) \right] \qquad (24)$$

Note that in the flowchart shown in FIG. 4, the processing of step S3-2 may be performed after step S3-1, as described above, or the processing of steps S3-1 and S3-2 may be performed in parallel. Alternatively, the processing of step S3-1 may be performed after step S3-2.

According to the configuration of the first embodiment, described above, in the frequency offset compensation unit 32 of the optical reception device 2, which receives a coherent optical signal that includes a training signal, the timing detection unit 60 detects the reception training signal corresponding to the training code sequence for frequency offset estimation within the reception signal that is acquired by converting the received coherent optical signal into an electric signal. Here, the training code sequence for frequency offset estimation is a code sequence constituted by multi-value phase modulation symbols, in which the deviation angle of the vector average of the one-symbol delay differential component of a training signal generated on the basis of the training code sequence for frequency offset estimation has a prescribed angle and the modulation phase difference between adjacent symbols has a fixed, repeated pattern. The frequency offset compensation unit 32 calculates a plurality of delay differential components on the basis of the reception training signal detected by the timing detection unit 60 and at least two delay signals of the reception training signal, each delay signal having a different number of delay symbols, and calculates an averaged frequency offset amount using the calculated plurality of delay differential components. More specifically, the frequency offset compensation unit 32 calculates the one-symbol delay differential component and the two-symbol delay differential component of the reception training signal, calculates a first vector of a differential component between the vector average of the one-symbol delay differential component of the reception training signal and the vector average of the one-symbol delay differential component of the training signal, calculates a second vector in which the phase component of the predetermined angle, which is determined in advance on the basis of the prescribed angle and the total angle of the elements of the modulation phase difference included in the repeated pattern, has been removed from the vector of the differential component between the respective vector averages of the one-symbol delay differential component and the two-symbol delay differential component of the reception training signal, and calculates the frequency offset amount by averaging the calculated first and second vectors. The frequency offset compensation processing unit 61 performs frequency offset compensation on the reception signal using the frequency offset amount calculated by the frequency offset compensation unit 32.

By performing the processing for averaging the first and second vectors, or in other words processing for adding together formula (11) and formula (22), the frequency offset compensation unit 32 can reduce the noise component. As a result, the frequency offset can be estimated with a higher precision than when only formula (11) is used, or in other words when the method of NPL 4, which employs only the one-symbol delay differential component, is used.

Accordingly, as described above, when the frequency offset is estimated with a similar degree of precision to the method of NPL 4 using the frequency offset compensation unit 32 of the first embodiment, the length of the training code sequence for frequency offset estimation can be shortened in comparison with the method of NPL 4. Therefore, in the optical transmission system S of the first embodiment, by employing a training code sequence for frequency offset estimation in which the one-symbol delay differential component $\Delta t_1(n)$ of the training signal t(n) is a certain fixed, repeated code sequence, the length of the preamble 601 can be reduced. In other words, a frequency offset amount can be estimated with a high degree of precision in a digital coherent system using a training code sequence with a short sequence length.

Note that although with the configuration of the first embodiment, as described above, the sequence length L of the training code sequence for frequency offset estimation can be shortened in comparison with the method of NPL 4, in actuality, the sequence length L must be set as described below. As illustrated in formula (11) and formula (22), the frequency offset compensation unit 32 of the first embodiment estimates the frequency offset amount by accurately calculating the vector average over the length L from the start n=0.

In an actual configuration, however, a slight timing error may occur in the timing detection unit 60. For example, when the timing detection unit 60 makes an error of Δn symbols in the start position of the training signal t(n), the interval in which the vector average is calculated becomes n=n+Δn to n=L+Δn such that a vector component is generated from an erroneous interval, and as a result, an error occurs in the estimated frequency offset amount.

Even when a timing error occurs, as long as the sequence length L of the training code sequence for frequency offset estimation is sufficiently longer than the sequence length of the timing error Δn, the vector component of the correct interval is dominant over the vector component of the erronous interval in the interval n+Δn to L+Δn.

Therefore, as long as the vector component of the correct interval is not zero, the effect of the vector component of the erroneous interval can be ignored. The condition that the vector component of the correct interval is not zero can be satisfied by ensuring that the deviation angle $\theta_r$ of the vector average serving as the sum of the one-symbol delay differential component $\Delta t_1(n)$ of the training signal t(n) added from 0 to L, as described above, is not zero.

Hence, according to the configuration of the first embodiment, although the sequence length of the training code sequence for frequency offset estimation can be shortened in comparison with the method of NPL 4, the sequence length L must be set at a length corresponding to the allowable timing error Δn of the timing detection unit 60.

Second Embodiment

Figure 5:
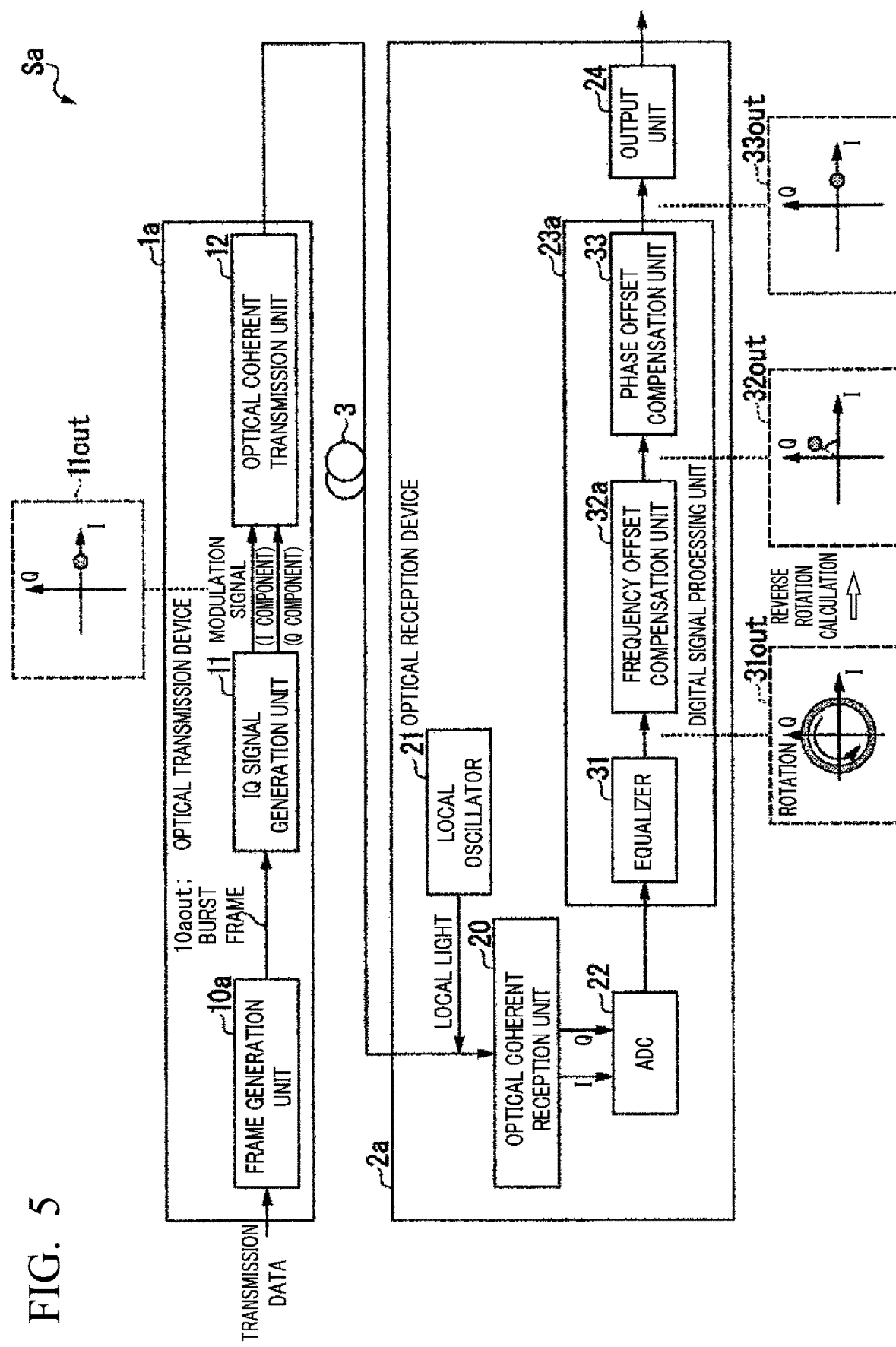
FIG. 5 is a block diagram showing a configuration of an optical transmission system according to a second embodiment of the present invention.

FIG. 5 is a block diagram showing a configuration of an optical transmission system Sa according to a second embodiment. In the second embodiment, identical reference symbols have been allocated to configurations that are identical to the first embodiment, and different configurations will be described below.

In the first embodiment, the modulation phase difference $\Delta\theta_1(n)$ between adjacent symbols of the training code sequence for frequency offset estimation has a repeated pattern constituted by three elements, namely "(½)π", "π", and "−(½)π". In the second embodiment, however, a generalized training code sequence for frequency offset estimation (referred to hereafter as the training code sequence for frequency offset estimation of the second embodiment), in which the modulation phase difference $\Delta\theta_1(n)$ between adjacent symbols has a repeated pattern constituted by M elements, is used.

Further, in the first embodiment, the frequency offset amount is estimated using the one-symbol delay differential component and the two-symbol delay differential component of the reception training signal, whereas the second embodiment is generalized so that a plurality of delay differential components from the one-symbol delay differential component to a P-symbol delay differential component are used (note that P is an integer of 2 or more).

The optical transmission system Sa of the second embodiment includes an optical transmission device 1a, an optical reception device 2a, and the optical transmission path 3. The optical transmission device 1a includes a frame generation unit 10a, the IQ signal generation unit 11, and the optical coherent transmission unit 12. The frame generation unit 10a generates a burst signal 10aout by writing the training code sequence for frequency offset estimation of the second embodiment, which is stored in advance in an internal storage area, to the preamble 601.

The optical reception device 2a includes the optical coherent reception unit 20, the local oscillator 21, the ADC 22, a digital signal processing unit 23a, and the output unit 24. The digital signal processing unit 23a includes the equalizer 31, a frequency offset compensation unit 32a, and the phase offset compensation unit 33.

Figure 6:
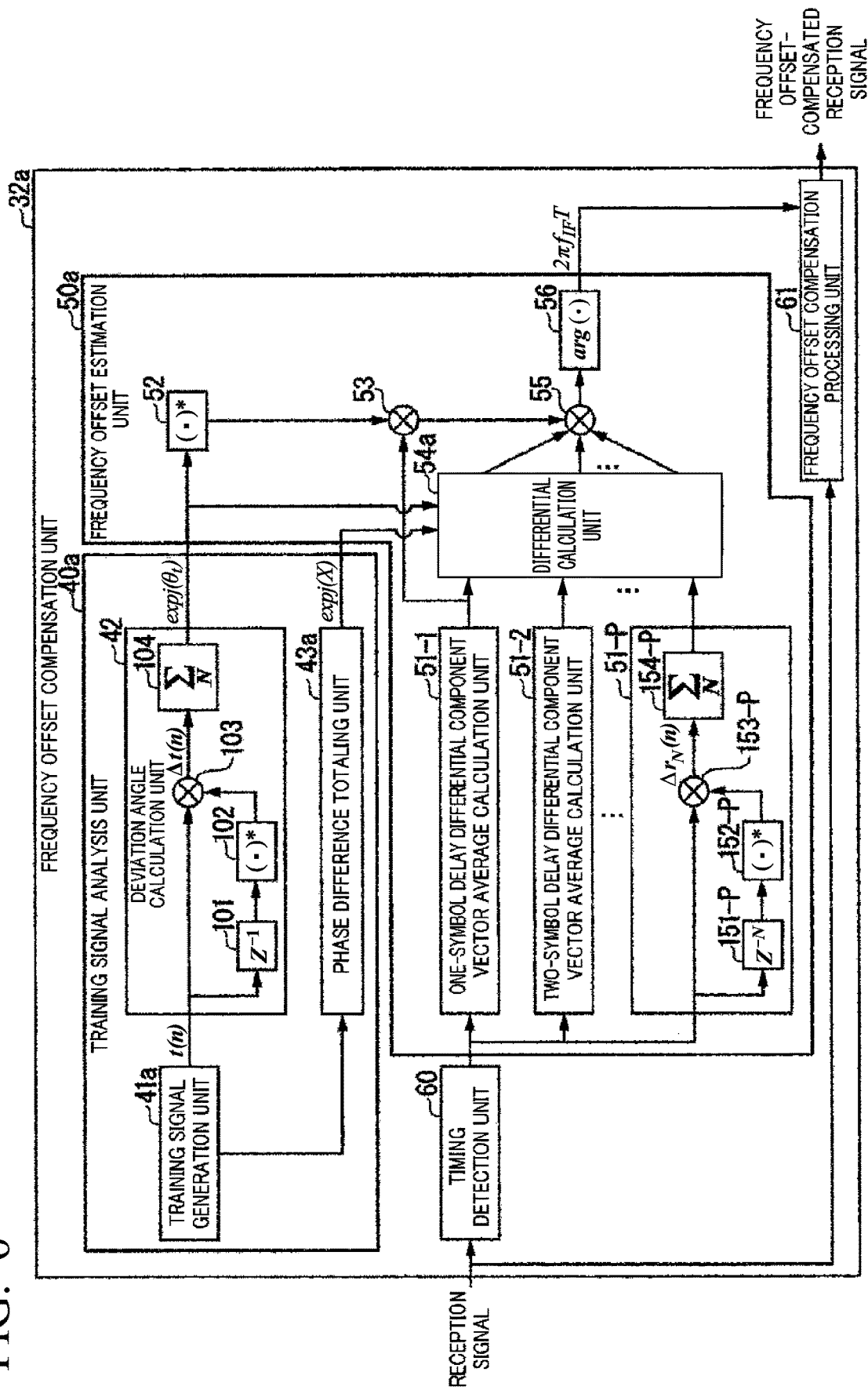
FIG. 6 is a block diagram showing an internal configuration of a frequency offset compensation unit of the second embodiment.

The frequency offset compensation unit 32a has an internal configuration shown in FIG. 6, and includes a training signal analysis unit 40a, a frequency offset estimation unit 50a, the timing detection unit 60, and the frequency offset compensation processing unit 61.

The training signal analysis unit 40a includes a training signal generation unit 41a, the deviation angle calculation unit 42, and a phase difference totaling unit 43a. The training signal generation unit 41a stores, in advance in an internal storage area, the training code sequence for frequency offset estimation of the second embodiment, and "M", which represents the number of elements in the repeated pattern of the modulation phase difference $\Delta\theta_1(n)$. Further, the training signal generation unit 41a generates and outputs the training signal t(n) on the basis of the training code sequence for frequency offset estimation of the second embodiment, stored in the internal storage area.

Note that the training code sequence for frequency offset estimation of the second embodiment and the number of elements included in the repeated pattern of the modulation phase difference $\Delta\theta_1(n)$ are assumed to be stored in advance in the internal storage area of the training signal generation unit 41a by the following means. For example, the optical reception device 2a receives the training code sequence for frequency offset estimation and the number of elements from the optical transmission device 1a over a separate communication line having a high communication quality, or the optical reception device 2a takes in information indicating the training code sequence for frequency offset estimation and the number of elements by means such as reading the information from a recording medium. The training signal generation unit 41a writes the information indicating the training code sequence for frequency offset estimation and the number of elements, taken in thereby, to the internal storage area so that the information is stored therein in advance.

The phase difference totaling unit 43a reads the information indicating the training code sequence for frequency offset estimation of the second embodiment and the number of elements "M" included in the repeated pattern of the modulation phase difference $\Delta\theta_1(n)$, which are stored in the internal storage area of the training signal generation unit 41. Further, the phase difference totaling unit 43a calculates the sum "X" of the modulation phase differences $\Delta\theta_1(n)$ of the training code sequence for frequency offset estimation in M consecutive symbols on the basis of formula (25) shown below, which is acquired by generalizing formula (13). Further, the phase difference totaling unit 43a outputs expj (X), which is a vector in which the calculated value "X" is included in the phase. Note that in formula (25), "c" is a predetermined arbitrary integer, and X takes a fixed value regardless of n.

[Formula 25]

$$X = \sum_{n=c}^{c+M-1} \Delta\theta_1(n) \tag{25}$$

The frequency offset estimation unit 50a includes the one-symbol delay differential component vector average calculation unit 51-1, the two-symbol delay differential component vector average calculation unit 51-2, ..., a P-symbol delay differential component vector average calculation unit 51-N, the complex conjugator 52, the multiplier 53, a differential calculation unit 54a, the adder 55, and the deviation angle device 56.

Here, the internal configuration will be described using a p-symbol delay differential component vector average calculation unit 51-N, where p is an integer from 2 to P, to represent the two-symbol delay differential component vector average calculation unit 51-2, ..., and the P-symbol delay differential component vector average calculation unit 51-N. Each p-symbol delay differential component vector average calculation unit 51-N includes a p-symbol delay device 151-p, a complex conjugator 152-p, a multiplier 153-p, and a vector averaging device 154-p.

In the p-symbol delay differential component vector average calculation unit 51-p, the p-symbol delay device 151-p, having taken in a reception training signal r(n+p), outputs a p-symbol delay signal r(n). The complex conjugator 152-p outputs a signal of the complex conjugate of the signal taken in thereby. The multiplier 153-p multiplies the two signals taken in thereby and outputs the multiplication result. The vector averaging device 154-p determines a vector average by calculating the sum of the vectors in the range of the sequence length L of the training code sequence for frequency offset estimation, and outputs the determined vector average.

Here, formulae generalizing the vector average of the p-symbol delay differential components $\Delta r_p(n)$ serving as the outputs of the respective p-symbol delay differential component vector average calculation units 51-p will be described. First, a p-symbol delay differential component $\Delta t_p(n)$ of the training signal t(n) is defined by formula (26) below, which is acquired by generalizing formula (15).

[Formula 26]

$$\Delta t_p(n)=t(n+p)\cdot t(n)^*=\exp j(\varphi_m(n+p)-\varphi_m(n))= \\ \exp j(\Delta\theta_p(n)) \tag{26}$$

Further, by dividing the p-symbol delay differential component $t_p(n)$ of the training signal t(n) by case, the p-symbol delay differential component $t_p(n)$ can be expressed as follows.

When M<p, the p-symbol delay differential component $t_p(n)$ can be expressed by formula (27) below.

[Formula 27]

$$\Delta t_p(n) = \prod_{k=n}^{n+M-1} t(k+1)\cdot t(k)^* \cdot \prod_{k=n+M}^{n+M+D-1} t(k+1)\cdot t(k)^* \tag{27}$$

$$= \exp j(X) \cdot \prod_{k=n+M}^{n+M+D-1} t(k+1)\cdot t(k)^*$$

When M>p, the p-symbol delay differential component $t_p(n)$ can be expressed by formula (28) below.

[Formula 28]

$$\Delta t_p(n) = \prod_{k=n}^{n+M-1} t(k+1)\cdot t(k)^* \cdot \prod_{k=n+M-(M-p)}^{n+M-(M-p)+D-1} \{t(k+1)\cdot t(k)^*\}^* \tag{28}$$

$$= \exp j(X) \cdot \prod_{k=n+p}^{n+p+D-1} \{t(k+1)\cdot t(k)^*\}^*$$

When M=p, the p-symbol delay differential component $t_p(n)$ can be expressed by formula (29) below.

[Formula 29]

$$\Delta t_p(n)=\exp j(X) \tag{29}$$

Note that D in formulae (27) and (28) is D=M−p.

Here, the p-symbol delay differential component $\Delta r_p(n)$ of the reception training signal r(n) is defined by formula (30) below, which is acquired by generalizing formula (19).

[Formula 30]

$$\Delta r_p(n) = r(n+p) \cdot r(n)^*$$
$$= \exp j((n+p)2\pi f_{IF}T + \varphi_m(n+p) - \{n2\pi f_{IF}T + \varphi_m(n)\})$$
$$= \exp j(p \cdot 2\pi f_{IF}T + \Delta\theta_p(n)) \quad (30)$$

Further, by dividing the p-symbol delay differential component $\Delta r_p(n)$ by case, the p-symbol delay differential component $\Delta r_p(n)$ can be expressed as follows.

(i) When p=M+1, formula (31) is acquired from formula (27).

[Formula 31]

$$\Delta r_p(n) = \exp j(p \cdot 2\pi f_{IF}T) \cdot \exp j(X) \cdot \prod_{k=n+M}^{n+M+D-1} t(k+1) \cdot t(k)^* \quad (31)$$

When the vector average of formula (31) is calculated, formula (32), shown below, is acquired.

[Formula 32]

$$\sum_{n=0}^{L} \Delta r_p(n) \cong \exp j(\theta_t + X) \cdot \exp j(p \cdot 2\pi f_{IF}T) \quad (32)$$

(ii) When p=M−1, formula (33) is acquired from formula (28).

[Formula 33]

$$\Delta r_p(n) = \exp j(p \cdot 2\pi f_{IF}T) \cdot \exp j(X) \cdot \prod_{k=n+p}^{n+p+D-1} \{t(k+1) \cdot t(k)^*\}^* \quad (33)$$

When the vector average of formula (33) is calculated, formula (34), shown below, is acquired.

[Formula 34]

$$\sum_{n=0}^{L} r_p(n) \cong \exp j(-\theta_t + X) \cdot \exp j(p \cdot 2\pi f_{IF}T) \quad (34)$$

(iii) When M=p, formula (35) is acquired from formula (29).

[Formula 35]

$$\Delta r_p(n) = \exp j(p \cdot 2\pi f_{IF}T + X) \quad (35)$$

When the vector average of formula (35) is calculated, formula (36), shown below, is acquired.

[Formula 36]

$$\sum_{n=0}^{L} \Delta r_p(n) \cong \exp j(X) \cdot \exp j(p \cdot 2\pi f_{IF}T) \quad (36)$$

The differential calculation unit 54a performs a calculation in accordance with a predetermined arithmetic expression on the output values of each of the one-symbol delay differential component vector average calculation unit 51-n, . . . , and the P-symbol delay differential component vector average calculation unit 51-P using expj(θ$_t$), output by the deviation angle calculation unit 42, and expj(X), output by the phase difference totaling unit 43a. Further, by performing this calculation, the differential calculation unit 54a calculates expj ($2\pi f_{IF}T$), in which the frequency offset amount of each output value of the one-symbol delay differential component vector average calculation unit 51-n, . . . , and the P-symbol delay differential component vector average calculation unit 51-P is included in the phase.

(Processing of Frequency Offset Estimation Unit According to Second Embodiment)

Figure 7:
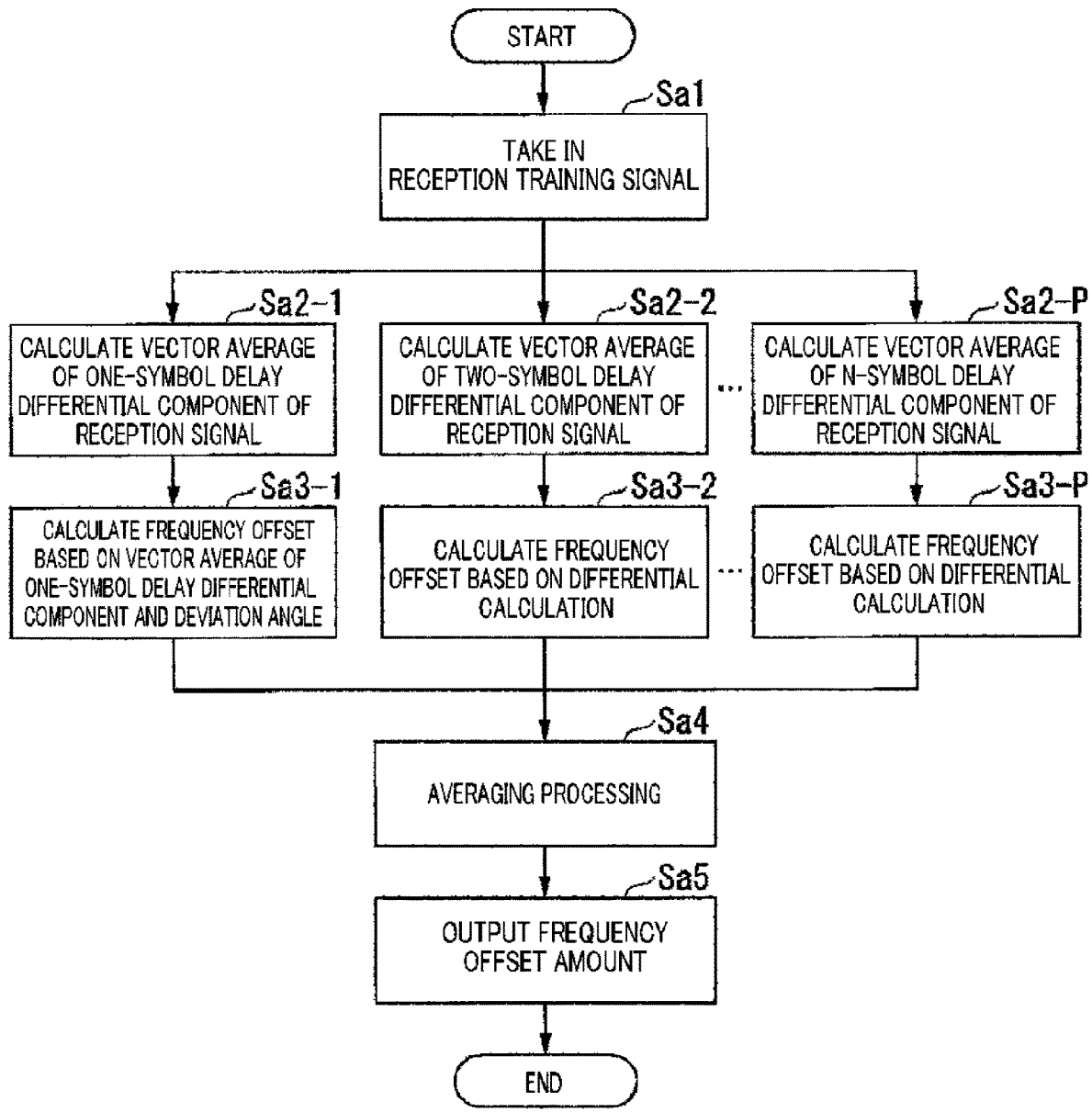
FIG. 7 is a flowchart showing a flow of processing executed by the frequency offset compensation unit of the second embodiment.

Next, the processing performed by the frequency offset estimation unit 50a of the second embodiment will be described. FIG. 7 is a flowchart showing a flow of processing executed by the frequency offset estimation unit 50a. It is assumed that prior to the start of the processing shown in FIG. 7, the deviation angle calculation unit 42 of the training signal analysis unit 40a calculates expj(θ$_t$) as a vector in which the prescribed deviation angle θ$_t$ is included in the phase on the basis of the training signal t(n) generated by the training signal generation unit 41a, and outputs the calculation result to the frequency offset estimation unit 50a. It is also assumed that the phase difference totaling unit 43a of the training signal analysis unit 40a calculates X on the basis of formula (25), calculates expj(X) as a vector in which X is included in the phase, and outputs expj(X) to the frequency offset estimation unit 50a.

Furthermore, an example in which M=3 and P=4 will be described below as an example.

The one-symbol delay differential component vector average calculation unit 51-1, the two-symbol delay differential component vector average calculation unit 51-2, a three-symbol delay differential component vector average calculation unit 51-3, and a four-symbol delay differential component vector average calculation unit 51-4 of the frequency offset estimation unit 50a take in the reception training signal r(n) output by the timing detection unit 60 (step Sa1).

The one-symbol delay differential component vector average calculation unit 51-1 performs similar processing to that of step S2-1 of the first embodiment so as to calculate the vector average of the one-symbol delay differential component of the reception training signal and output the result to the multiplier 53 and the differential calculation unit 54a (step Sa2-1).

In the two-symbol delay differential component vector average calculation unit 51-2, the two-symbol delay device 151-2, complex conjugator 152-2, and multiplier 153-2 calculate the two-symbol delay differential component $\Delta r_2$(n) of the reception training signal on the basis of the reception training signal r(n+2) taken in thereby. The vector averaging device 154-2 calculates the sum of the two-symbol delay differential component $\Delta r_2$(n) of the reception training signal added over the sequence length L as the vector average of the two-symbol delay differential component of the reception training signal. Here, since M=3 and p=2, p=M−1, and therefore formula (34) is applied. The two-symbol delay differential component vector average calculation unit 51-2 outputs the calculated vector average of the two-symbol delay differential component of the reception training signal to the multiplier 53 and the differential calculation unit 54a (step Sa2-2).

In the three-symbol delay differential component vector average calculation unit 51-3, a three-symbol delay device 151-3, a complex conjugator 152-3, and a multiplier 153-3 calculate a three-symbol delay differential component $\Delta r_3(n)$ of the reception training signal on the basis of a reception training signal $r(n+3)$ taken in thereby. A vector averaging device 154-3 calculates the sum of the three-symbol delay differential component $\Delta r_3(n)$ of the reception training signal added over the sequence length L as the vector average of the three-symbol delay differential component of the reception training signal. Here, since M=3 and p=3, M=p, and therefore formula (36) is applied. The vector averaging device 154-3 outputs the calculated vector average of the three-symbol delay differential component of the reception training signal to the multiplier 53 and the differential calculation unit 54a (step Sa2-3).

In the four-symbol delay differential component vector average calculation unit 51-4, a four-symbol delay device 151-4, a complex conjugator 152-4, and a multiplier 153-4 calculate a four-symbol delay differential component $\Delta r_4(n)$ of the reception training signal on the basis of a reception training signal $r(n+4)$ taken in thereby. A vector averaging device 154-4 calculates the sum of the four-symbol delay differential component $\Delta r_4(n)$ of the reception training signal added over the sequence length L as the vector average of the four-symbol delay differential component of the reception training signal. Here, since M=3 and p=4, p=M+1, and therefore formula (32) is applied. The vector averaging device 154-4 outputs the calculated vector average of the four-symbol delay differential component of the reception training signal to the multiplier 53 and the differential calculation unit 54a (step Sa2-4).

The complex conjugator 52 outputs the complex conjugate $\exp j(-\theta_t)$ of $\exp j(\theta_t)$, output by the deviation angle calculation unit 42 of the training signal analysis unit 40a, to the multiplier 53. The multiplier 53 performs the calculation of formula (11) on the basis of the vector average of the one-symbol delay differential component of the reception training signal, output by the one-symbol delay differential component vector average calculation unit 51-1, and $\exp j(-\theta_t)$, output by the complex conjugator 52, and outputs the calculation result to the adder 55 (step Sa3-1).

The differential calculation unit 54a calculates $(X-2\theta_t)$ as the predetermined angle determined in advance on the basis of $\exp j(\theta_t)$ output by the deviation angle calculation unit 42 and $\exp j(X)$ output by the phase difference totaling unit 43. The differential calculation unit 54a calculates the differential component between the vector average of the one-symbol delay differential component of the reception training signal, output by the one-symbol delay differential component vector average calculation unit 51-1, and the vector average of the two-symbol delay differential component of the reception training signal, output by the two-symbol delay differential component vector average calculation unit 51-2. The differential calculation unit 54a performs a calculation shown below in formula (37) to remove the predetermined angle from the differential component by multiplying $\exp j(-X+2\theta_t)$, which is the complex conjugate of the vector in which the predetermined angle is included in the phase, by the calculated differential component. The differential calculation unit 54a outputs the calculation result to the adder 55 (step Sa3-2).

[Formula 37]

$$\sum_{n=0}^{L} \Delta r_2(n) \cdot \left\{ \sum_{n=0}^{L} \Delta r_1(n) \right\}^* \cdot \exp j(X)^* \cdot \exp j(2\theta_t) = \exp j(2\pi f_{IF} T) \quad (37)$$

Note that formula (37) is identical to formula (22) of the first embodiment.

The differential calculation unit 54a sets $(\theta_t)$, which is the deviation angle of $\exp j(\theta_t)$ output by the deviation angle calculation unit 42, as the predetermined angle determined in advance. The differential calculation unit 54a calculates a differential component between the vector average of the two-symbol delay differential component of the reception training signal, output by the two-symbol delay differential component vector average calculation unit 51-2, and the vector average of the three-symbol delay differential component of the reception training signal, output by the three-symbol delay differential component vector average calculation unit 51-3. The differential calculation unit 54a performs a calculation shown below in formula (38) to remove the predetermined angle $(\theta_t)$ from the differential component by multiplying $\exp j(-\theta_t)$, which is the complex conjugate of the vector in which the predetermined angle is included in the phase, by the calculated differential component. The differential calculation unit 54a outputs the calculation result to the adder 55 (step Sa3-3).

[Formula 38]

$$\sum_{n=0}^{L} \Delta r_3(n) \cdot \exp j(\theta_t)^* \cdot \left\{ \sum_{n=0}^{L} \Delta r_2(n) \right\}^* = \exp j(2\pi f_{IF} T) \quad (38)$$

The differential calculation unit 54a sets $(\theta_t)$, which is the deviation angle of $\exp j(\theta_t)$ output by the deviation angle calculation unit 42, as the predetermined angle determined in advance. The differential calculation unit 54a calculates a differential component between the vector average of the three-symbol delay differential component of the reception training signal, output by the three-symbol delay differential component vector average calculation unit 51-3, and the vector average of the four-symbol delay differential component of the reception training signal, output by the four-symbol delay differential component vector average calculation unit 51-4. The differential calculation unit 54a performs a calculation shown below in formula (39) to remove the predetermined angle from the differential component by multiplying $\exp j(-\theta_t)$, which is the complex conjugate of the vector in which the predetermined angle is included in the phase, by the calculated differential component. The differential calculation unit 54a outputs the calculation result to the adder 55 (step Sa3-4).

[Formula 39]

$$\sum_{n=0}^{L} \Delta r_4(n) \cdot \exp j(\theta_t)^* \cdot \left\{ \sum_{n=0}^{L} \Delta r_3(n) \right\}^* = \exp j(2\pi f_{IF} T) \quad (39)$$

The adder 55 adds the output value of the multiplier 53 to the output values of the differential calculation unit 54a. More specifically, the adder 55 adds together the calculation result generated by the right side of formula (11), the calculation result generated by the left side of formula (37), the calculation result generated by the left side of formula (38), and the calculation result generated by the left side of formula (39), and outputs the resulting addition value to the deviation angle device 56 (step Sa4). The deviation angle device 56 calculates the deviation angle of the addition value output by the adder 55 and outputs the calculated deviation angle to the frequency offset compensation processing unit 61 as the frequency offset amount (step Sa5).

Note that the processing of steps Sa3-1, Sa3-2, . . . , and Sa3-P may be performed either in parallel or in order of steps Sa3-1, Sa3-2, . . . , and Sa3-P.

According to the configuration of the second embodiment, described above, the frequency offset compensation unit 32a of the optical reception device 2a, which receives a coherent optical signal that includes a training signal, further calculates a p (where p is an integer of at least 2) symbol delay differential components and a (p+1)-symbol delay differential component of the reception training signal, and calculates a third vector in which the phase component of the predetermined angle, which is determined in advance on the basis of the prescribed angle, has been removed from the vector of the differential component between the respective vector averages of the p-symbol delay differential component and the (p+1)-symbol delay differential component of the reception training signal.

The frequency offset compensation unit 32a calculates the frequency offset amount by averaging the first vector and the second vector, which are described below, and the calculated third vector. The first vector is the vector of the differential component between the vector average of the one-symbol delay differential component of the reception training signal and the vector average of the one-symbol delay differential component of the training signal. The second vector is a vector in which the phase component of the predetermined angle, which is determined in advance on the basis of the prescribed angle and the total angle of the elements of the modulation phase difference included in the repeated pattern, has been removed from the vector of the differential component between the respective vector averages of the one-symbol delay differential component and the two-symbol delay differential component of the reception training signal.

Hence, in the second embodiment, the number of vectors subjected to averaging is larger than in the first embodiment, and therefore the noise component can be further reduced, with the result that the frequency offset amount can be calculated with an even higher degree of precision. Therefore, in the second embodiment, when the frequency offset amount is estimated with a similar degree of precision to the first embodiment, the length of the training code sequence for frequency offset estimation can be shortened in comparison with the first embodiment. As a result, likewise in the second embodiment, a frequency offset amount can be estimated with a high degree of precision in a digital coherent system using a training code sequence with a short sequence length.

Note that in the second embodiment, described above, when p>M, the p-symbol delay differential component $\Delta t_p$(n) of the training signal can be generalized as shown below in formula (40).

[Formula 40]

$$\Delta t_p(n) = \exp j\left(\sum_{k=0}^{p-M} \Delta\theta_1(n+M+k)\right) \quad (40)$$

The vector average of the p-symbol delay differential component $\Delta t_p$(n) of the training signal is expressed as shown below in formula (41).

[Formula 41]

$$\sum_{n=0}^{L} \Delta t_p(n) = \sum_{n=0}^{L} \exp j\left(\sum_{k=0}^{p-M} \Delta\theta_1(n+M+k)\right) = \exp j(\theta_p) \quad (41)$$

In formula (41), $\theta_p$ is the deviation angle of the vector acquired when the p-symbol delay differential component $\Delta t_p$(n) of the training signal is added over the sequence length L of the training code sequence for frequency offset estimation.

Here, formula (42) is defined as follows.

[Formula 42]

$$\sum_{n=0}^{L} \Delta t_q(n) = \exp j(\theta_{tq}) \quad (42)$$

In the case of M+1, $\theta_p$ becomes "$\theta_p = X + \theta_t$". Further, in the case of M+2, $\theta_p$ becomes "$\theta_p = X + \theta_{t2}$". Furthermore, in the case of M−2, $\theta_p$ becomes "$\theta_p = X − \theta_{t2}$".

In other words, when p>M, by setting q=p−M, "$\theta_p$" can be expressed by formula (43) below.

[Formula 43]

$$\theta_p = X + \theta_{tq} \quad (43)$$

When formula (43) is used, formula (32) in a case where p=M+1 can be generalized to p>M and expressed by formula (44) below.

[Formula 44]

$$\sum_{n=0}^{L} \Delta r_p \cong \exp j(\theta_p) \cdot \exp j(q \cdot 2\pi f_{IF} T) = \exp j(X + \theta_{tq} + q \cdot 2\pi f_{IF} T) \quad (44)$$

Furthermore, in the second embodiment, the frequency offset amount is averaged by adding together formula (11), formula (37), formula (38), and formula (39), but the configuration of the present invention is not limited to this embodiment, and the frequency offset amount may be averaged using any desired combination of formulae, for example by adding together only formula (11) and formula (38), adding together only formula (11) and formula (39), and so on.

Moreover, in the first and second embodiments described above, the training signal generation unit 41, 41a stores the number of elements included in the repeated pattern of the modulation phase difference $\Delta\theta_1$(n) in an internal storage area, but instead, the phase difference totaling unit 43, 43a may detect the number of elements.

Furthermore, in the first and second embodiments described above, the frequency offset compensation unit 32, 32a includes the training signal analysis unit 40, 40a, but the configuration of the present invention is not limited to this embodiment. Instead, for example, the vector exp j($\theta_t$) in which $\theta_t$ is included in the phase and the vector exp j(X) in which X is included in the phase may be calculated and stored in advance in an internal storage area of the frequency offset estimation unit 50, 50a. Then, when the frequency offset estimation unit 50, 50a performs the processing for estimating the frequency offset amount, the complex conjugator 52 and the differential calculation unit 54, 54*a* may refer to the vectors expj(θ$_r$) and expj(X) stored in the internal storage area. By employing this configuration, the frequency offset compensation unit 32, 32*a* can be formed without the training signal analysis unit 40, 40*a*.

In the embodiments described above, the frame generation unit 10, 10*a* of the optical transmission device 1, la and the digital signal processing unit 23, 23*a* of the optical reception device 2, 2*a* may be realized by a computer. In this case, a program for realizing the functions thereof may be recorded on a computer-readable recording medium, and the aforesaid units may be realized by causing a computer system to read and execute the program recorded on the recording medium. Note that here, the "computer system" is assumed to include an OS and hardware such as peripheral devices. Further, the "computer-readable recording medium" is a portable medium such as a flexible disk, a magneto-optical disk, a ROM, or a CD-ROM, or a storage device such as a hard disk installed in the computer system. The "computer-readable recording medium" may also be a medium that holds the program dynamically for a short time, such as a communication line in a case where the program is transmitted over a network such as the Internet or a communication line such as a telephone line, or a medium that holds the program for a fixed time, such as a volatile memory installed in the computer system of a server or a client in the aforesaid case. Furthermore, the program may be a program for realizing some of the functions described above or a program that can realize the functions described above in combination with a program already recorded on the computer system, and may also be realized using a programmable logic device such as an FPGA (Field Programmable Gate Array).

Embodiments of this invention were described in detail above with reference to the figures, but the specific configurations are not limited to these embodiments and also include designs and the like within a scope that does not depart from the spirit of the invention.

REFERENCE SIGNS LIST

1 Optical transmission device
2 Optical reception device
3 Optical transmission path
10 Frame generation unit
11 IQ signal generation unit
12 Optical coherent transmission unit
20 Optical coherent reception unit
21 Local oscillator
22 ADC
23 Digital signal processing unit
24 Output unit
31 Equalizer
32 Frequency offset compensation unit
33 Phase offset compensation unit

The invention claimed is:

1. An optical receiving apparatus for receiving a coherent optical signal that includes a training signal, the optical receiving apparatus comprising:
a timing detection unit configured to detect a reception training signal corresponding to a training code sequence for frequency offset estimation within a reception signal acquired by converting the received coherent optical signal into an electric signal;
a frequency offset estimation unit configured to calculate a plurality of delay differential components on basis of the reception training signal detected by the timing detection unit and at least two delay signals of the reception training signal, each delay signal having a different number of delay symbols, and calculates an averaged frequency offset amount using the calculated plurality of delay differential components; and
a frequency offset compensation processing unit configured to perform frequency offset compensation on the reception signal using the frequency offset amount calculated by the frequency offset estimation unit,
wherein the training code sequence for frequency offset estimation is a code sequence constituted by multi-value phase modulation symbols, in which a deviation angle of a vector average of a one-symbol delay differential component of the training signal generated on the basis of the code sequence has a prescribed angle, and a modulation phase difference between adjacent symbols has a fixed, repeated pattern,
wherein each of the timing detection unit, the frequency offset estimation unit and the frequency offset compensation processing unit is implemented by:
i) computer executable instructions executed by at least one processor,
ii) at least one circuitry or
iii) a combination of computer executable instructions executed by at least one processor and at least one circuitry.

2. The optical receiving apparatus according to claim 1, wherein a sequence length of the training code sequence for frequency offset estimation is a multiple of a number of elements included in the fixed, repeated pattern of the modulation phase difference between the adjacent symbols.

3. The optical receiving apparatus according to claim 1, wherein, when the frequency offset estimation unit calculates a one-symbol delay differential component and a two-symbol delay differential component of the reception training signal, the frequency offset estimation unit calculates a first vector of a differential component between a vector average of the one-symbol delay differential component of the reception training signal and the vector average of the one-symbol delay differential component of the training signal, calculates a second vector in which a phase component of a predetermined angle, determined in advance on the basis of the prescribed angle and a total angle of the elements of the modulation phase difference included in the repeated pattern, has been removed from a vector of a differential component between respective vector averages of the one-symbol delay differential component and the two-symbol delay differential component of the reception training signal, and calculates the frequency offset amount by averaging the calculated first and second vectors.

4. The optical receiving apparatus according to claim 3, wherein, when the frequency offset estimation unit calculates a p (where p is an integer of at least 2) symbol delay differential component and a (p+1)-symbol delay differential component of the reception training signal, the frequency offset estimation unit calculates a third vector in which a phase component of a predetermined angle, determined in advance on the basis of the prescribed angle, has been removed from a vector of a differential component between respective vector averages of the p-symbol delay differential component and the (p+1) symbol delay differential component of the reception training signal, calculates the frequency offset amount by averaging the first vector, the second vector, and the third vector when p includes 2, and calculates the frequency offset amount by averaging the first vector and the third vector when p does not include 2.

5. The optical receiving apparatus according to claim 4, wherein, when the number of elements included in the fixed, repeated pattern of the modulation phase difference between adjacent symbols is set as M (where M represents number of elements in the repeated pattern of the modulation phase difference), p takes a value of M−1, or M, or M+1, or all of these values.

6. The optical receiving apparatus according to claim 1, wherein the timing detection unit, when detecting the reception training signal corresponding to the training code sequence for frequency offset estimation within the reception signal, detects, as the reception training signal, an interval of the reception signal including all or a part of the training code sequence for frequency offset estimation, the interval having a length that corresponds to sequence length of the training code sequence for frequency offset estimation.

7. A frequency offset estimation method comprising:
receiving, by a processor, a coherent optical signal that includes a training signal generated using a code sequence constituted by multi-value phase modulation symbols, in which a deviation angle of a vector average of a one-symbol delay differential component of a signal generated on the basis of the code sequence has a prescribed angle, and a modulation phase difference between adjacent symbols has a fixed, repeated pattern;
detecting, by a processor, a reception training signal corresponding to a training code sequence for frequency offset estimation within a reception signal acquired by converting the received coherent optical signal into an electric signal; and
calculating, by a processor, a plurality of delay differential components on the basis of the detected reception training signal and at least two delay signals of the reception training signal, each delay signal having a different number of delay symbols, and calculating an averaged frequency offset amount, which is used to compensate for a frequency offset in the reception signal, using the calculated plurality of delay differential components.

* * * * *